US009477687B2

(12) United States Patent
Lee et al.

(10) Patent No.: US 9,477,687 B2
(45) Date of Patent: Oct. 25, 2016

(54) MOBILE TERMINAL AND METADATA SETTING METHOD THEREOF

(75) Inventors: Choonsik Lee, Seoul (KR); Younghun Nam, Seoul (KR); Donghyun Lee, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 131 days.

(21) Appl. No.: 13/152,103

(22) Filed: Jun. 2, 2011

(65) Prior Publication Data

US 2012/0121187 A1    May 17, 2012

(30) Foreign Application Priority Data

Nov. 15, 2010 (KR) .................. 10-2010-0113184

(51) Int. Cl.
G06F 17/30 (2006.01)

(52) U.S. Cl.
CPC ... *G06F 17/30265* (2013.01); *G06F 17/30247* (2013.01)

(58) Field of Classification Search
CPC ............... G06F 17/30265; G06F 17/30247
See application file for complete search history.

(56) References Cited

U.S. PATENT DOCUMENTS

| | | | | |
|---|---|---|---|---|
| 5,904,727 | A * | 5/1999 | Prabhakaran | G08G 1/127 340/990 |
| 6,093,923 | A * | 7/2000 | Vock | A63B 24/0003 250/206.1 |
| 6,636,296 | B1 * | 10/2003 | Faulkner | G01C 3/22 33/277 |
| 7,408,665 | B2 * | 8/2008 | Watanabe et al. | 358/1.15 |
| 7,474,808 | B2 * | 1/2009 | Ozaki et al. | 382/305 |
| 7,694,885 | B1 | 4/2010 | Bourdev | |
| 7,698,336 | B2 * | 4/2010 | Nath | 707/737 |
| 7,822,545 | B2 * | 10/2010 | Kanda et al. | 701/420 |
| 7,978,232 | B1 * | 7/2011 | Khan | 348/231.3 |
| 2001/0024236 | A1 * | 9/2001 | Sato et al. | 348/239 |
| 2002/0103813 | A1 * | 8/2002 | Frigon | 707/104.1 |
| 2003/0036848 | A1 * | 2/2003 | Sheha | G01C 21/3679 701/468 |
| 2004/0119826 | A1 * | 6/2004 | Yunoki | 348/207.1 |
| 2004/0264780 | A1 * | 12/2004 | Zhang et al. | 382/224 |
| 2005/0027705 | A1 * | 2/2005 | Sadri | G06F 17/30994 |
| 2005/0078174 | A1 * | 4/2005 | Casey et al. | 348/61 |
| 2006/0069503 | A1 * | 3/2006 | Suomela et al. | 701/211 |
| 2007/0078848 | A1 * | 4/2007 | Sareen | G06T 3/4038 |
| 2007/0110316 | A1 | 5/2007 | Ohashi | |
| 2008/0052276 | A1 * | 2/2008 | Tzamaloukas | G06Q 30/02 |
| 2008/0069480 | A1 * | 3/2008 | Aarabi et al. | 382/305 |
| 2008/0077595 | A1 * | 3/2008 | Leebow | 707/10 |
| 2008/0118157 | A1 * | 5/2008 | Takayama | 382/195 |
| 2008/0162649 | A1 * | 7/2008 | Lee et al. | 709/206 |
| 2008/0229248 | A1 * | 9/2008 | Fagans et al. | 715/838 |
| 2008/0297409 | A1 * | 12/2008 | Klassen et al. | 342/357.06 |

(Continued)

FOREIGN PATENT DOCUMENTS

JP    2005-311939    11/2005

*Primary Examiner* — Rehana Perveen
*Assistant Examiner* — Huen Wong
(74) *Attorney, Agent, or Firm* — Lee, Hong, Degerman, Kang & Waimey PC; Jonathan Kang; Justin Lee

(57) ABSTRACT

A mobile terminal and metadata setting method thereof are disclosed, by which metadata of various types can be set. The present invention includes displaying an image including at least one object, selecting a specific object from the at least one object, extracting the specific object from the image, setting the metadata for the extracted specific object, and storing the metadata set for the specific object and an image including the specific object.

8 Claims, 28 Drawing Sheets

(56) References Cited

U.S. PATENT DOCUMENTS

| | | | |
|---|---|---|---|
| 2008/0310688 A1* | 12/2008 | Goldberg | 382/118 |
| 2009/0094188 A1 | 4/2009 | Covannon et al. | |
| 2009/0105945 A1* | 4/2009 | Nonaka | 701/208 |
| 2009/0214082 A1* | 8/2009 | Hoshi | 382/106 |
| 2009/0268047 A1* | 10/2009 | Sogoh et al. | 348/222.1 |
| 2009/0312871 A1* | 12/2009 | Lee et al. | 700/259 |
| 2009/0316961 A1 | 12/2009 | Gomez Suarez et al. | |
| 2010/0046842 A1 | 2/2010 | Conwell | |
| 2010/0284566 A1* | 11/2010 | Hisatomi et al. | 382/103 |
| 2012/0183172 A1* | 7/2012 | Stroila | 382/100 |
| 2012/0310968 A1* | 12/2012 | Tseng | 707/769 |

* cited by examiner (a)

(b)

(a)

(b)

(a)

(b)

(a)

(b)

(a)

(b)

(a)

(b)

MOBILE TERMINAL AND METADATA SETTING METHOD THEREOF

CROSS-REFERENCE TO RELATED APPLICATIONS

Pursuant to 35 U.S.C. §119(a), this application claims the benefit of earlier filing date and right of priority to Korean Application No. 10-2010-0113184, filed on Nov. 15, 2010, the contents of which is hereby incorporated by reference herein in its entirety.

BACKGROUND OF THE INVENTION

1. Field of the Invention

The present invention relates to a mobile terminal, and more particularly, to a mobile terminal and metadata setting method thereof. Although the present invention is suitable for a wide scope of applications, it is particularly suitable for setting metadata of various types.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal Generally, metadata plays a role in providing generation information on a corresponding content. For instance, in case of playing a video (i.e., example of a content), the mobile terminal is able to just provide an information on a generated date of the video or an information on a person having generated toe video.

According to the above-described art, it is unable to set metadata for a specific content variously in accordance with a user's demand.

According to the above-described art, assuming that a content is an image, it is able to set metadata on the video only. In particular, it is unable to set metadata on an object included in the image.

According to the above-described art, since metadata for a content is limited, it is unable to meet the user's demand for intending to receive various kinds of informations on a currently used content.

SUMMARY OF THE INVENTION

Accordingly, the present invention is directed to a mobile terminal and metadata setting method thereof that substantially obviate one or more problems due to limitations and disadvantages of the related art.

An object of the present invention is to provide a mobile terminal and metadata setting method thereof, by which metadata of various types can be set.

Another object of the present invention is to provide a mobile terminal and metadata setting method thereof, by which metadata of various types can be set on an object included in an image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit displaying an image including at least one object, a user input unit receiving an input of a selection action on a specific one of the at least one object, a controller extracting the specific object selected by the selection action from the image, the controller setting a metadata for the extracted specific object, and a memory storing the metadata set for the specific object and an image including the specific object.

In another aspect of the present invention, a method of setting a metadata in a mobile terminal includes the steps of displaying an image including at least one object, selecting a specific object from the at least one object, extracting the specific object from the image, setting the metadata for the extracted specific object, and storing the metadata set for the specific object and an image including the specific object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

And, the suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
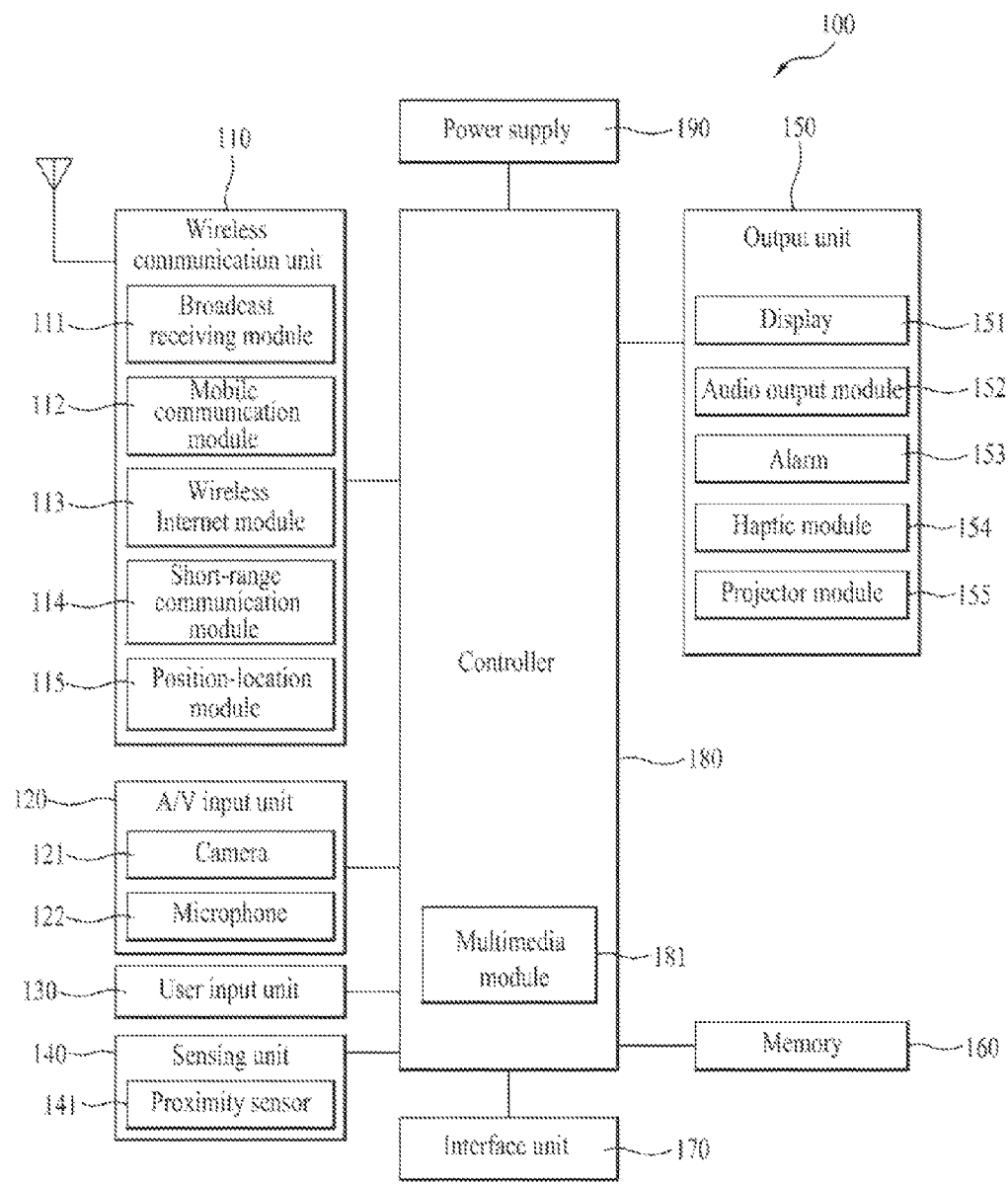
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (NV) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

First of all, a mobile terminal mentioned in the following description can include at least one of the components shown in FIG. 1. Moreover, the mobile terminal can include a wireless communication unit 110 configured to transceive data with an external server via a network.

Contents or data, on which the metadata mentioned in the present specification can be set, can include images (e.g., still images, videos, etc.), audios, document files, flash files, applications, web documents, webpages and the like, by which the present invention is non-limited.

In case that a corresponding content is an image, a metadata can be set on the image or a specific object included in the image. In particular, if a corresponding content is a video, a metadata can be set on a specific one of a plurality of still images included in the video.

Metadata (or attribute information) mentioned in the present specification is the data set on a content according to a predetermined rule to describe or define data. The metadata is usable for the purpose of representing a corresponding content. And, the metadata is also usable for the purpose of finding a corresponding content quickly.

For instance, a date/hour information of creation of a metadata set content or a date/hour information of upload to a content managing server, a creation subject information (e.g., person or terminal information) of a corresponding content or an upload subject information of a corresponding content, a weather information (e.g., temperature, humidity, etc.) on creation of a corresponding content, a terminal position information on a corresponding content creation and the like can be included in the metadata.

Moreover, a comment information (e.g., comment) on a corresponding content, an information (e.g., phone number, blog address, ID information registered with a social network service, etc.) on a specific terminal (or a specific person), a history information (e.g., information on terminals having used a corresponding content, etc.) on a use of the corresponding content, an information searched from a web server using a corresponding content or a specific object included in the corresponding content and the like can be included in the metadata.

Assuming that a corresponding content is an image, a specific object itself included in the image, a position information of a specific object included in the image, a sex distinction index (or a sex distributed extent) of persons included in the image, an activity index (or a motion extent) of objects included in the image, a color index (or a color distribution extent) of color included in the image and the like can be included in the metadata.

Assuming that a corresponding content is a video, a motion pattern (e.g., motion of interest: MOI) for a predetermined period of time of a specific object included in the video, a mark information on a specific part (e.g., an interval between 30 seconds and 1 minute from a play start point, etc.) within the video and the like can be included in the metadata.

Identification information on a content having metadata set thereon is included in the metadata. And, an identification information on a metadata set on a content can be included in the corresponding content. This is to search for a content having a metadata set thereon using the corresponding metadata and to search for a content set on the metadata using the corresponding content. In this case, regarding the identification information, any information for identifying a corresponding content or a corresponding metadata is non-limited by its type or configuration.

Metadata can be stored and managed separately from a content having the metadata set thereon. Alternatively, the metadata can be stored and managed in a manner of being included in the content having the metadata set thereon.

Of course, the metadata is non-limited by the above examples and can be set to have more various informations in association with the corresponding content. The settings of the metadata shall be described in detail later.

In the following description, a metadata managing system, to which the present invention is applicable, is described with reference to FIG. 2. In the following description, a transmission by a terminal (or a reception by a server) conceptionally includes an upload. And, a reception by a terminal (or a transmission by a server) can conceptionally include a download.

Figure 2:
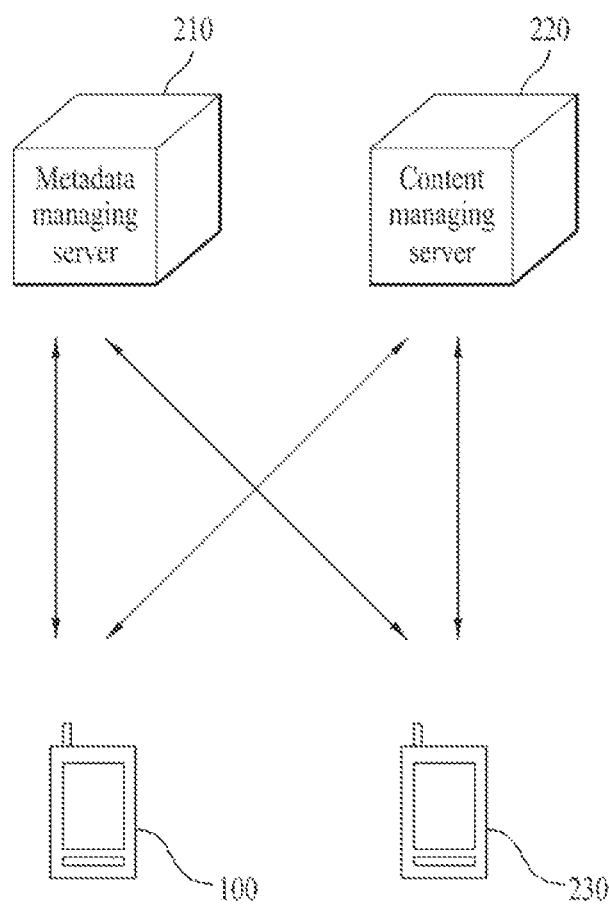
FIG. 2 is a diagram of a metadata managing system according to the present invention.

FIG. 2 is a diagram of a metadata management system according to the present invention.

Referring to FIG. 2, a metadata management system according to the present invention includes a metadata managing server 210 configured to manage and store metadata, a content managing server 220 configured to manage and store contents, and a plurality of terminals (e.g., a mobile terminal 110 and a counterpart terminal 230 included) configured to transceive the metadata and the contents with the metadata managing server 210 and the content managing server 220, respectively.

The mobile terminal 100 or the counterpart terminal 230 transmits a content to the content managing server 220 and is also able to transmit a metadata set on the transmitted content to the metadata managing server 210.

The mobile terminal 100 or the counterpart terminal 230 receives the content stored in the content managing server 220 from the content managing server 220 and is able to receive the metadata set on the received content from the metadata managing server 210.

For instance, the content managing server 220 provides the metadata managing server 210 with the identification information of the content currently provided to the mobile terminal 100. And, the metadata managing server 210 is able to provide the mobile terminal 100 with the metadata containing the provided identification information as the metadata set on the content currently provided to the mobile terminal 100.

So to speak, the mobile terminal 100 is able to individually transceive the metadata and the content having the metadata set thereon with the servers 210 for managing and storing the metadata and the content, respectively.

Therefore, a plurality of the terminals 100 and 230 can share the metadata and the metadata set content with each other via the metadata managing server 210 and the content managing server 220.

If the terminals are accessible to the metadata managing server 210 and the content managing server 220, they can share the metadata and the corresponding metadata set content with each other. Alternatively, only the terminals registered with the metadata and contents sharing service are allowed to share the metadata and the metadata set contents with each other.

Furthermore, the mobile terminal 100 is able to set a restriction condition on a content and a metadata set on the content. In this case, the restriction condition can be set as a sort of metadata. And, identification information of the corresponding content or identification information of the corresponding metadata can be included in the metadata including the restriction condition.

For instance, the mobile terminal 100 is able to put restriction on a content transmitted by the mobile terminal 100 itself or a specific metadata set on the corresponding content so that the corresponding content or the corresponding metadata is not available for a specific terminal. In this case, a specific terminal information (e.g., a phone number, an IP address, etc.) can be further set to the metadata. Therefore, if the specific terminal makes a request for a specific content transmission, the content managing server 220 transmits a content identification information and a specific terminal information to the metadata managing server 210. If the received specific terminal information matches a previously stored specific terminal information as metadata and a content identification information included in the matched metadata matches the received content identification information, the metadata managing server 210 does not provide the specific terminal with specific metadata or informs the content managing server of the match information not to provide the transmission requested content.

The restriction condition can further include at least one of a use time information, a use place information and the like. Therefore, the content or metadata may not be provided to terminals belonging (or not belonging) to a time zone corresponding to the use time information set to the restriction condition or a place corresponding to the use place information [cf. a case of setting a restriction condition to a specific terminal].

According to the above description, the metadata and the metadata-set content are managed and stored by the corresponding servers 210 and 220, respectively. Yet, the metadata and the metadata-set content can be managed by an integrated server by separating storage regions of the metadata and the metadata content from each other. Moreover, the metadata can be stored and managed in a manner of being contained in the content on which the metadata is set. In other words, the metadata and the corresponding metadata-set content can be stored and managed as one data instead of being managed and stored as separate data.

In the following description, a process for acquiring a terminal position information is explained in detail with reference to FIG. 3. For instance, a terminal position information or another position information using the terminal position information can be set to a sort of metadata.

Figure 3:
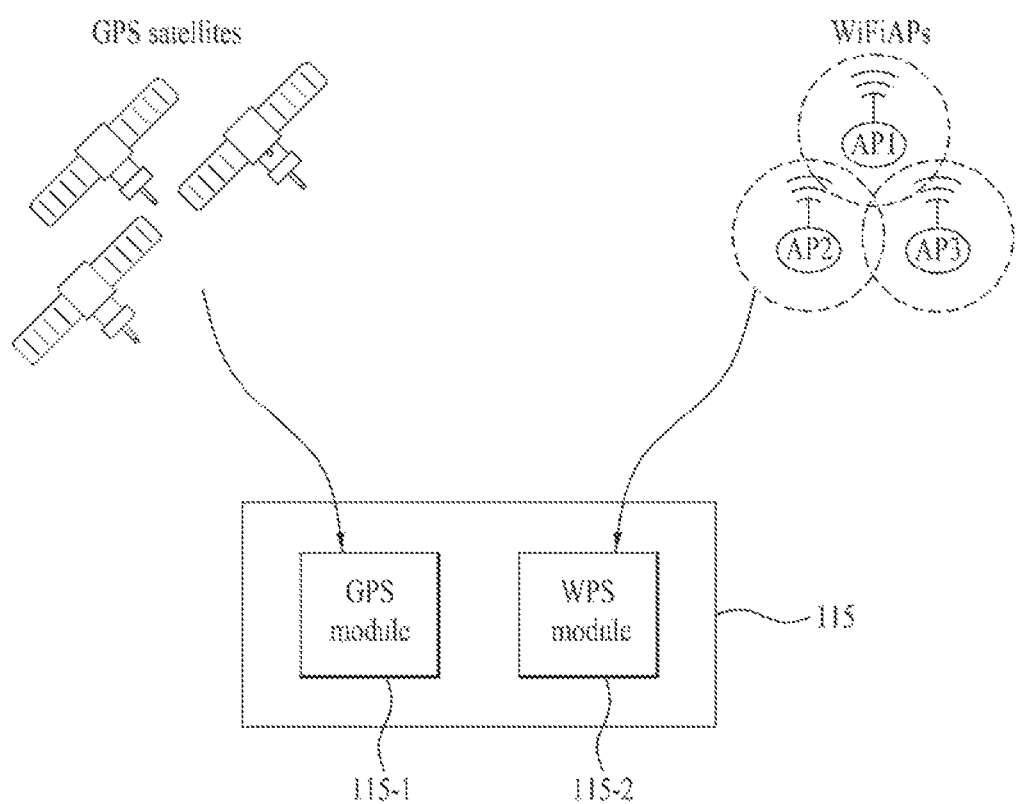
FIG. 3 is a diagram of a process for acquiring terminal position information according to the present invention.

FIG. 3 is a diagram of a process for acquiring terminal position information according to the present invention.

Referring to FIG. 3, the mobile terminal 100 is able to acquire its current position information using the position location module 115. In particular, the position location module 115 includes a GPS module 115-1 and a WPS module 115-2 and is able to acquire the current position information using each of the modules 115-1 and 115-2.

In more particular, the GPS module 115-1 receives a signal including a satellite position information from each of at least three GPS satellites using the GPS (global positioning system) and is able to acquire the current position information of the mobile terminal 110 from a distance between the mobile terminal 100, which plays a role as a GPS receiver), and each of the satellites and a position information of each of the satellites using such a method as triangulation and the like. For instance, the current position information can include latitude, longitude, altitude, coordinates information, moving speed and the like.

The WPS module 115-2 compares the information, which is acquired from each of at least three access points (APs) using the WPS (Wi-Fi positioning system), to the information stored in the database, receives a position information of each of the APs, and is then able to acquire the current position information of the mobile terminal 100 using the received AP position informations.

The position information acquisition using the WPS is available for a terminal incapable of the position information acquisition by GPS. Moreover, if a terminal capable of the position information acquisition by GPS is in a situation having difficulty in the position information acquisition by GPS (e.g., a situation that the corresponding terminal is situated in a building, etc.), the position information acquisition by WPS is usefully available.

In the following description, a method of setting metadata in a mobile terminal according to the present invention is explained with reference to the accompanying drawings. For clarity and convenience of the following description, a content type for setting metadata is limited to an image.

Figure 4:
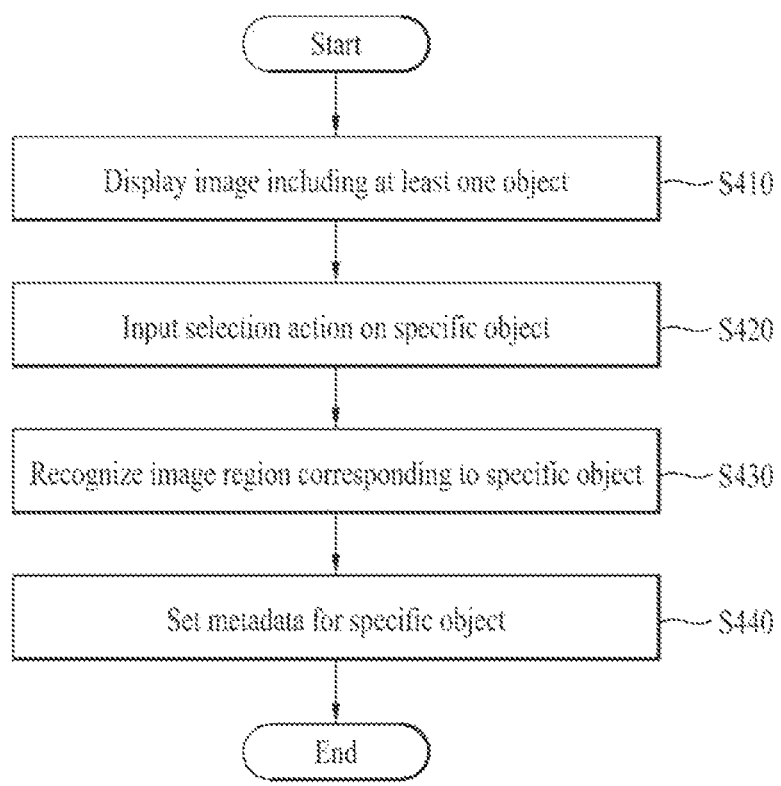
FIG. 4 is a flowchart for a method of setting metadata in a mobile terminal according to one embodiment of the present invention.

FIG. 4 is a flowchart for a method of setting metadata in a mobile terminal according to one embodiment of the present invention.

Referring to FIG. 4, the mobile terminal 100 displays an image including at least one object using the display unit 151 under the control of the controller 180 [S410].

In the displaying step S410, the mobile terminal 100 is able to display at least one of a preview image inputted via the camera 121, a photographed image taken using the camera 121, and a download image received from an external terminal or an external server.

For instance, the external server includes the content managing server 220 or is able to further include a web server (not shown in the drawing), a communication service provider server (not shown in the drawing) or the like. Moreover, the external server is able to include any kind of server capable of providing an image to a terminal.

In the following description, a metadata setting configuration via a menu item selection is explained with reference to FIGS. 5A to 5D.

For clarity and convenience of the following description, a menu item selection in a display state (cf. S410) of an image (including a specific object as a metadata setting target) is illustrated. Yet, the menu item selection is non-limited by the illustrated state but can be performed in any state in which a menu search is possible. Moreover, assume that the displayed image is a preview image.

For instance, the menu item selection can include one of a selection for whether a metadata setting target is an image or an object included in the image, a selection for an object selecting method, a selection for an object recognizing method and the like, which is described in detail as follows.

FIGS. 5A to 5D are diagrams of menu items related to metadata settings according to the present invention.

Figure 5A:
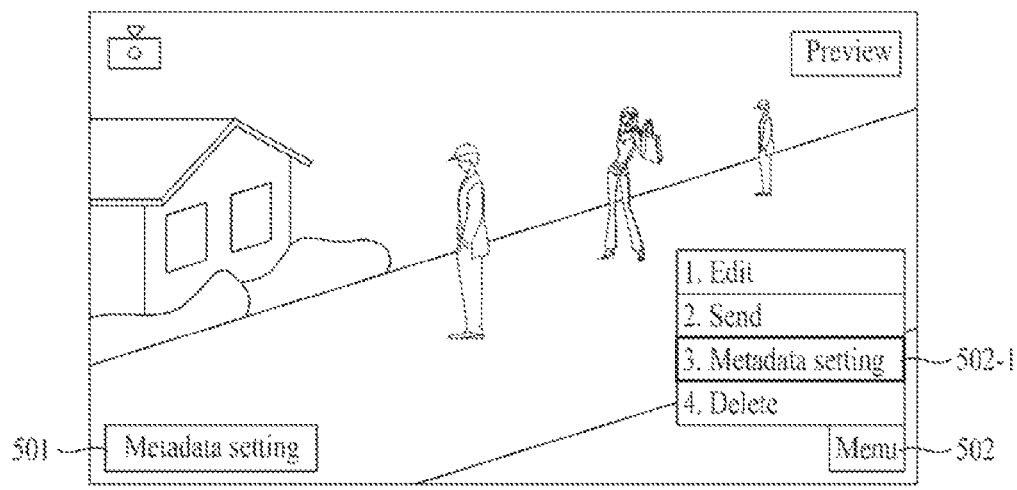
FIGS. 5A to 5D are diagrams of menu items related to metadata settings according to the present invention.

Referring to FIG. 5A, in case of receiving a selection of a key zone 501 corresponding to a metadata setting from a user or receiving a selection of a menu item 502-1 of a metadata setting from a user after selection of a menu zone 502 the mobile terminal 100 is able to receive an input of a signal (hereinafter named a display command signal) for commanding a display of a menu item related to a metadata setting.

Alternatively, the display command signal, which is non-limited by the above examples, can be inputted by such a method as a corresponding button key selection, a corresponding terminal motion (e.g., shaking, inclination at a predetermined angle in a predetermined direction, etc.), a corresponding voice input and the like.

Figure 5B:
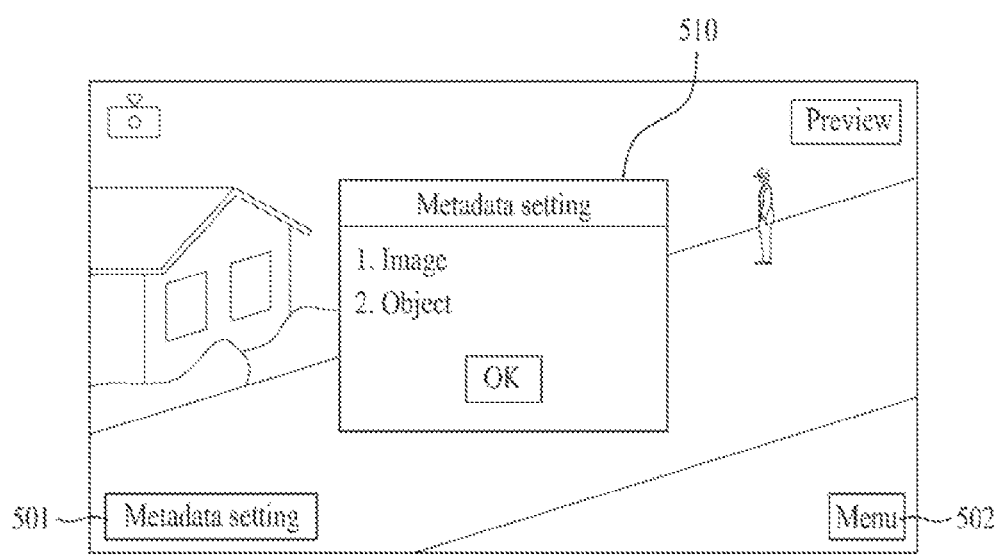

Referring to FIG. 5B, in case of receiving the input of the display command signal in FIG. 5A, the mobile terminal 100 is able to display a window 510 for enabling a user to select whether a metadata setting target is an image (or a picture) or an object included in the image on a screen. This can mean that metadata can be set on the image or the object included in the image.

Figure 5C:
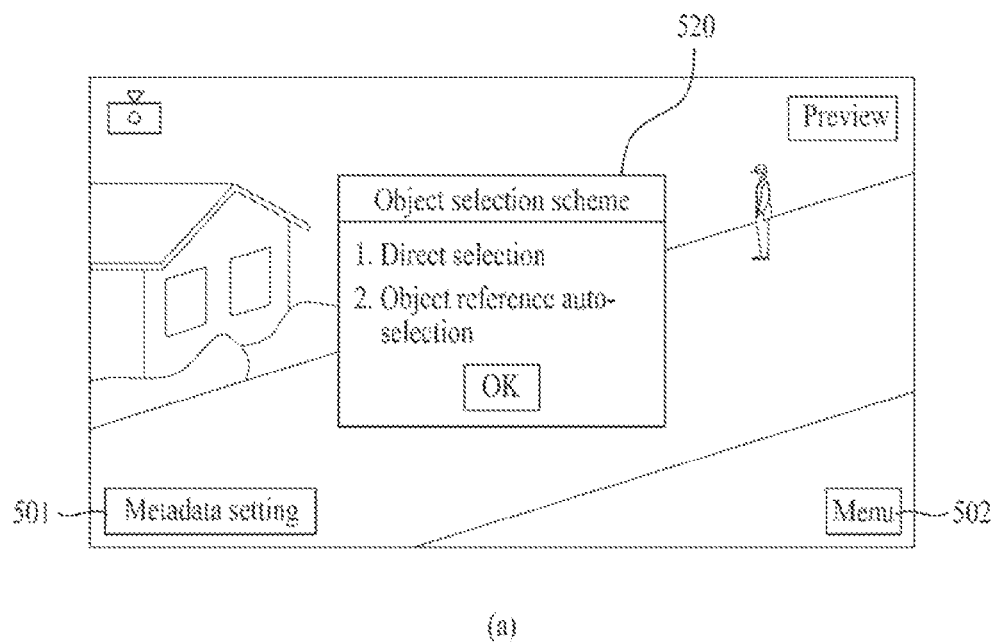
Figure 5C:
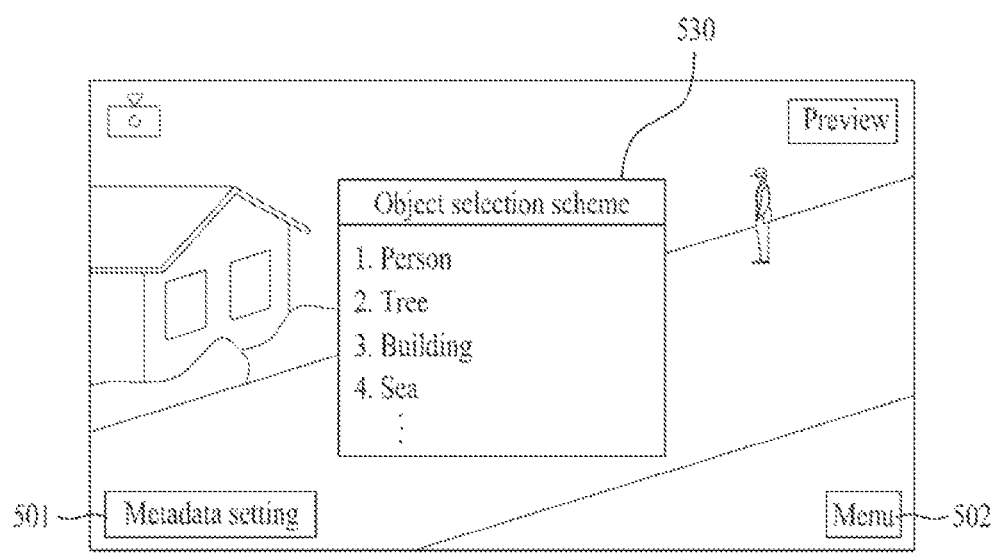

Referring to FIG. 5C, if the object is selected as the metadata setting target in FIG. 5B, the mobile terminal 100 is able to display an object selecting scheme list 520 on the screen [FIG. 5C (a)]. For instance, the object selecting scheme can include a direct selection and an object reference auto-selection. For instance, the direct selection means that the metadata is set on the object directly selected by a user. And, the object reference auto-selection can mean that the metadata is set on the object corresponding to an object type selected by the user.

If the object reference auto-selection is selected in FIG. 5C (a), the mobile terminal 100 is able to display an object type list 530 on the screen [FIG. 5C (b)]. For instance, the object type can include one of human, tree, building, sea and the like. If an image is currently displayed, an object type for at least one object included in the image can be included.

Therefore, the mobile terminal 100 is able to set select the object corresponding to the object type selected in FIG. 5C (b) as the metadata setting target object.

On the other hand, if the direct selection is selected in FIG. 5C (a), the mobile terminal 100 is able to select the object directly selected by the user as the metadata setting target object. Meanwhile, if the image is selected as the metadata setting target in FIG. 5B, the mobile terminal 100 is able to set the metadata for the selected image.

Figure 5D:
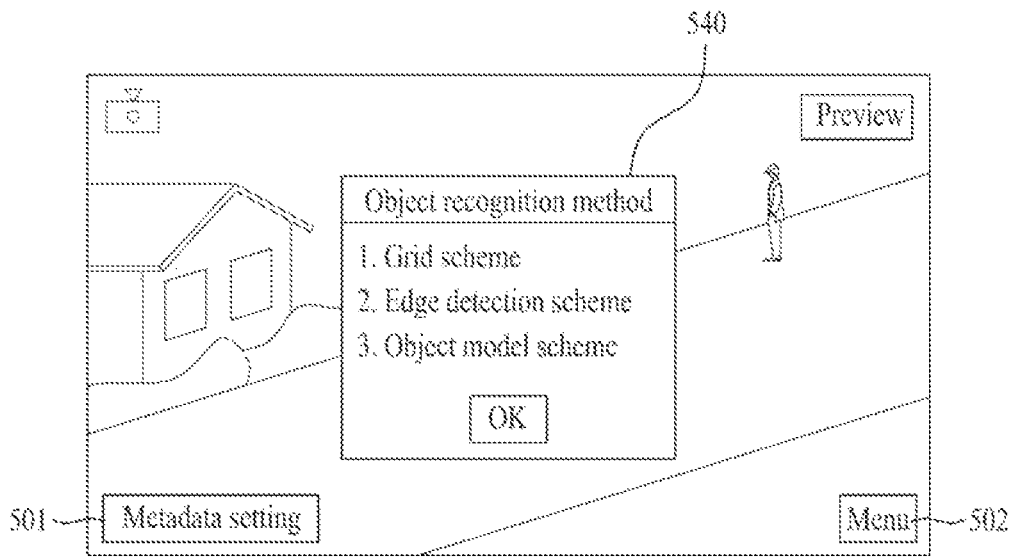
Figure 5D:
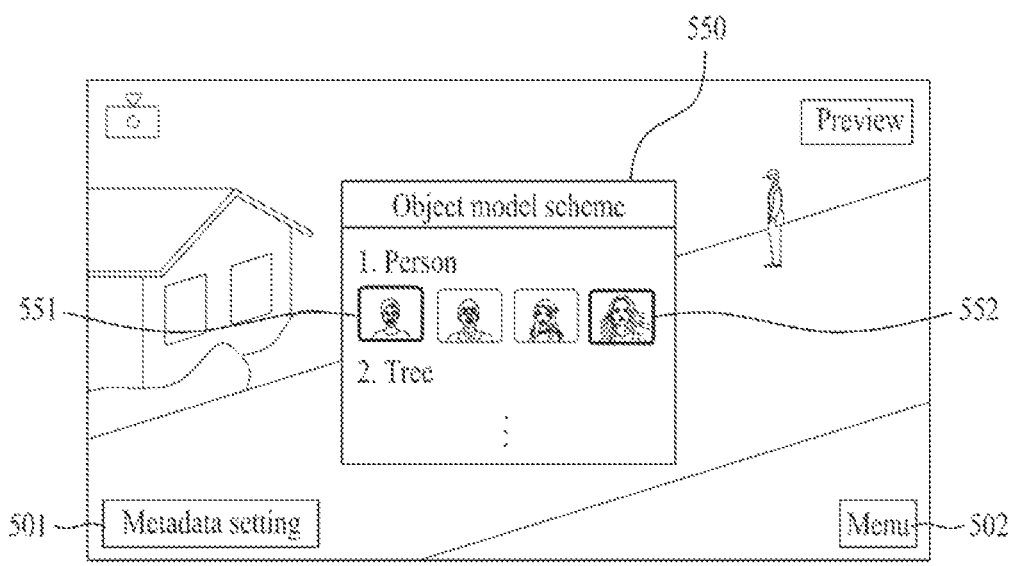

Referring to FIG. 5D, the mobile terminal 100 is able to display a window 540 for selecting a method (hereinafter named an image region recognizing method) of recognizing an image region corresponding to the object selected as the metadata setting target object [FIG. 5D (a)].

Figure 6A:
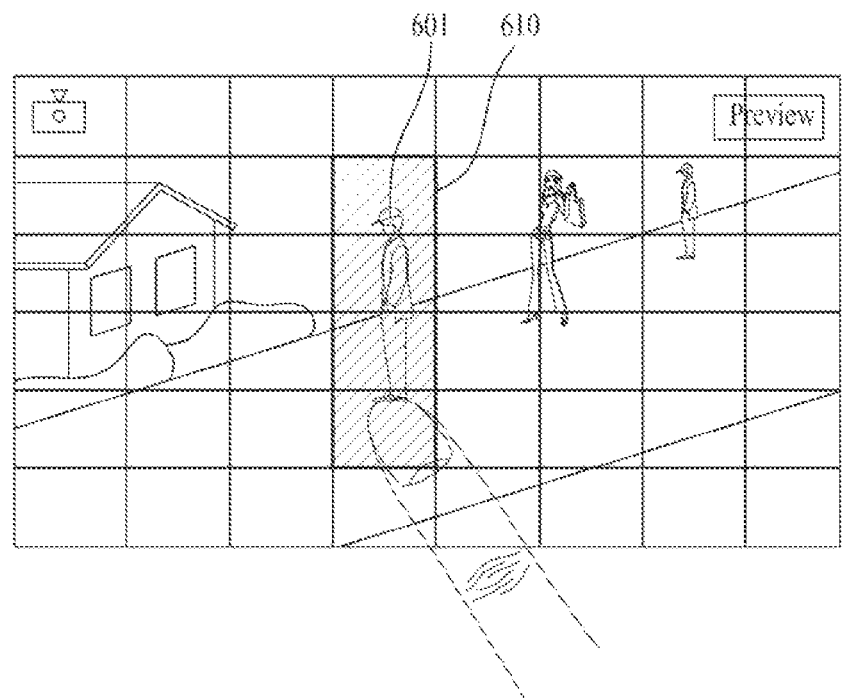
FIGS. 6A to 6C are diagrams for a method of recognizing a specific object according to the present invention.
Figure 6B:
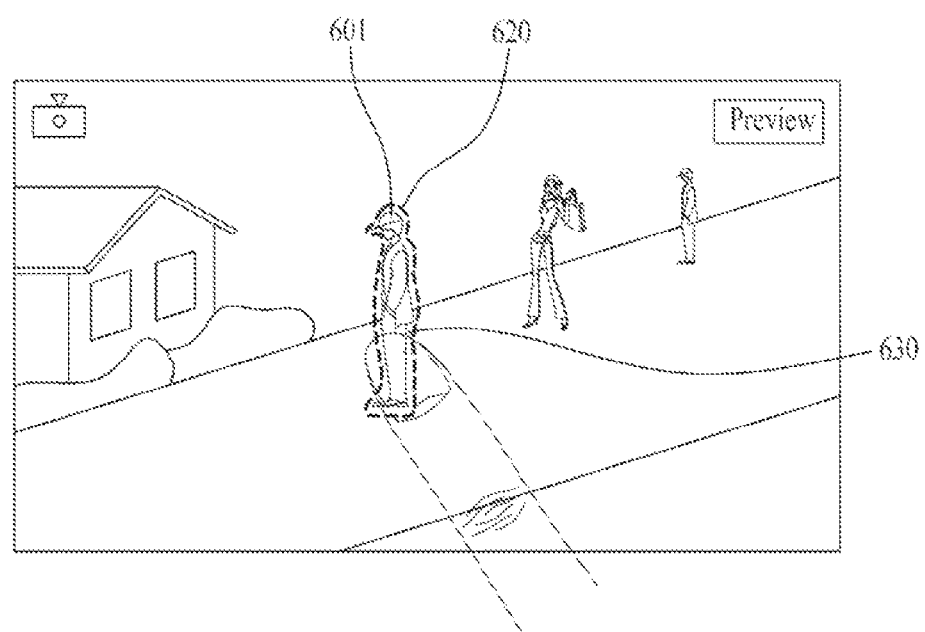
Figure 6C:
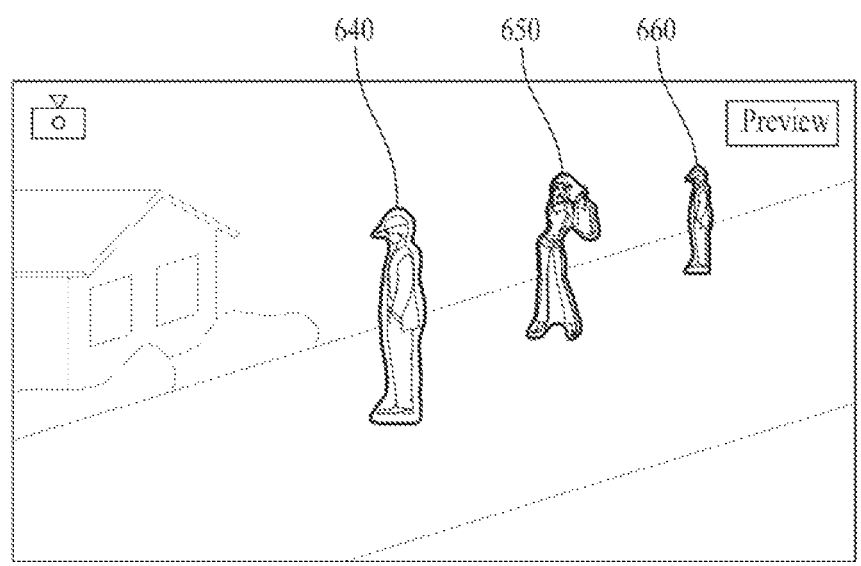

For instance, the image region recognizing method can include one of a grid scheme, an edge detection scheme, an object model scheme and the like [cf. FIGS. 6A to 6C]. In particular, the grid scheme or the edge detection scheme is useful in the direct selection is selected in FIG. 5C (a). The object model scheme can be useful if the object reference auto-selection is selected in FIG. 5C (a).

If the object model scheme is selected in FIG. 5D (a), the mobile terminal 100 displays a window 550 including model images per object and is then able to receive a selection of specific model images 551 and 552 from a plurality of model images corresponding to the specific object (e.g., a person). Therefore, the mobile terminal 100 is able to recognize the image region corresponding to the specific model images 551 and 552 (e.g., a whole body of a person, a person's face, etc.).

Referring now to FIG. 4, the mobile terminal 100 receives an input of a selection action on a specific one of the at least one or more objects included in the image displayed in the displaying step S410 using the user input unit 130 [S420].

The examples of the above-described metadata setting configuration (cf. FIGS. 5A to 5D) can be performed in case of receiving the input of the selection action on the specific object.

In particular, if the display unit 151 includes a touchscreen (i.e., example of the user input unit 130), the mobile terminal 100 is able to receive an input of a touch action on the specific object as the selection action [one example of the direct selection].

Alternatively, the mobile terminal 100 identifiably displays at least one object selectable from at least one or more objects (e.g., the mobile terminal 100 displays an outline of the at least one selectable object thick). If an identification information allocated to a specific one of the identifiably displayed objects is inputted, the mobile terminal 100 is able to receive an input of a selection action on the specific object [one example of the direct selection]. For instance, the identification information can be displayed for the identifiably displayed object or can be displayed as one of a numeral, a symbol, an object type and the like.

Alternatively, in case of receiving an input of a specific object type from a user, the mobile terminal 100 is able to select an object corresponding to the specific object type as a specific object from at least one or more objects included in a currently displayed image [cf. FIG. 5C (b)]. In this case, the specific object type can be inputted via a menu search, as shown in FIG. 5C (b), or can be inputted via a voice input of a corresponding name (e.g., person, tree, building, etc.) or a text input.

The selection action includes a selection action on a plurality of objects or can include a selection action on an object included in each of a plurality of images in case of displaying a plurality of the images on the screen.

The mobile terminal 100 recognizes an image region, which corresponds to the specific object selected by the inputted selection action from the displayed image, under the control of the controller 180 [S430]. As the mobile terminal 100 recognizes the image region corresponding to the specific object, the mobile terminal 100 is able to extract the specific object from the image including the specific object under the control of the controller 180.

For instance, the image region recognizing method can include one of a grid scheme, an edge detection scheme, an object model scheme and the like. Moreover, the mobile terminal 100 is able to recognize the image region corresponding to the specific object by the recognizing scheme selected by the user [cf. FIG. 5D].

In particular, according to the grid scheme, the displayed image is partitioned into a plurality of regions of a grid type. An object included in a region selected by a user from a plurality of the regions is selected as a specific object and the selected region is recognized as an image region of the specific object [Method 1]. Alternatively, a region including a specific object among a plurality of the regions can be recognized as an image region of a specific object [Method 2]. According to the grid scheme, although a precision of object recognition may be lowered, if a specific object itself is set to metadata, a metadata size can be decreased.

For instance, referring to FIG. 6A, while an the mobile terminal 100 partitions a screen in an image display state into a plurality of regions of a grid type, according to Method 1, the mobile terminal 100 selects an object 601 corresponding to a region 610 selected by a user as a specific object and is able to recognize the selected region 610 as an image region of the object 601. Alternatively, according to Method 2, the mobile terminal 100 is able to recognize the region 610 including the specific object 601 selected by the user as an image region of the specific object 601. Specifically, according to Method 2, the region 610 including the specific object 601 is selected by a user or can be automatically selected by the controller 180.

According to the edge detection scheme, after an edge or outline of a specific object has been detected, a line enclosing the specific object can be recognized as an image region of the specific object from the detected edge information [vector data] [Method 1] or a plane occupied by the specific object can be recognized as an image region of the specific object from the detected edge information [raster data] [Method 2].

For instance, referring to FIG. 6B, in case of receiving a selection action on a specific object 601, the mobile terminal 100 is able to recognize an image of the specific object 601 by the edge detection scheme. In this case, the image region recognized by Method 1 is indicated by a reference number '620' or the image region recognized by Method 2 can be indicated by a reference number '630'.

According to the object model scheme, a model image corresponding to each of at least one object type is designated in advance and an image of an object matching the designated model image can be then recognized. For instance, if an object type is a person, one of a male image, a female image, a whole body/face image of a male, a whole body/face image of a female, an image of a person having a hair length equal to or greater than a predetermined length and the like can be included in the model image.

In particular, if a user selects a specific object type, the mobile terminal 100 is able to recognize an image region of an object, which matches a model image corresponding to the selected specific object type, from at least one or more objects included in a currently displayed image.

Alternatively, if a user selects a specific object type and a specific model image of the specific object type, the mobile terminal 100 is able to recognize an image region of an object, which matches a specific model image among a plurality of model images corresponding to the selected specific object type, from at least one or more objects included in a currently displayed image.

For instance, referring to FIG. 6C, if a person is selected as a specific object type, the mobile terminal 100 is able to recognize image regions 640, 650 and 660 of objects, of objects of which object type is the person, among a plurality of objects included in a currently displayed image.

Moreover, referring to FIG. 6C, in order to raise a recognition extent of a specific object type selected by a user, the controller 180 raises a chroma of an object corresponding to the specific object type while lowering chromas of the rest of the objects [1], performs a gray processing on the rest of the objects [2], enables the object corresponding to the specific object type to be viewable only [3], or displays the object corresponding to the specific object type by substituting it with a specific diagram only [4].

In the following description, in case that the image displayed in the displaying step S410 is a video, a continuous recognition process for an image region corresponding to a specific object is explained.

First of all, in performing a continuous recognition process for an image region corresponding to a specific object, the mobile terminal 100 is able to use an image recognition technology. In this case, the image recognition technology includes one of a detecting technique, a tracking technique and the like.

In particular, the detecting technique means that an image region corresponding to a specific object is detected from an image. And, the detecting technique is able to detect a plurality of image regions of a plurality of objects from a single image. Moreover, the detected image region can be identifiably displayed using such a looped curve as a rectangle, circle and the like.

The tracking technique is performed in a following manner. First of all, after an image region corresponding to a specific object has been detected from an image, the specific object keeps being tracked in accordance with a motion of the specific object. Moreover, the tracking technique is able to track a plurality of object in a single image. The detected image region can have a different position in the consecutive images in accordance with the motion of the specific object.

In accordance with a presence or non-presence of an information on the selected specific object in advance, the mobile terminal 100 is able to directly extract the specific object from an image including the specific object without recognition of a corresponding image region in case of the presence of the information or is able to extract the specific object from the image including the specific object in a manner of recognizing the corresponding image region, as mentioned in the foregoing description, in case of the non-presence of the information.

In particular, if the information on the specific object exists in advance, the information on the specific object is previously stored in the memory 160 or can be previously stored in an external server that provides the specific object. Therefore, the controller 180 searches informations on a plurality of objects stored in the memory 160 or the external server for the information on the specific object and is then able to extract the specific object using the found information on the specific object.

Referring now to FIG. 4, the mobile terminal 100 sets a metadata for the specific object selected by the selection action inputted in the inputting step S420 under the control of the controller 180 [S440].

In particular, the mobile terminal 100 generates the metadata for the selected specific object and is then able to set the generated metadata on the specific object.

In the following description, various embodiments for the generation and setting of the metadata are explained.

According to a first embodiment, explained is a case that a position information of a specific object with reference to a current position information (hereinafter named a terminal position information) of the mobile terminal is set to metadata.

First of all, in the setting step S440, the mobile terminal 100 acquires the terminal position information (cf. FIG. 3) and a distance and direction information (hereinafter named object distance/direction information) of a specific object with reference to the mobile terminal 100 under the control of the controller 180. The mobile terminal 100 acquires the position information of the specific object using the acquired terminal position information and the object distance/direction information and is then able to set the acquired position information of the specific object to a metadata for the specific object.

In this case, the distance information of the specific object can be acquired using a standard unit object. And the direction information of the specific object can be acquired using a direction faced by the mobile terminal 100 [described later].

The first embodiment is described with reference to FIGS. A to 8D as follows.

Figure 7A:
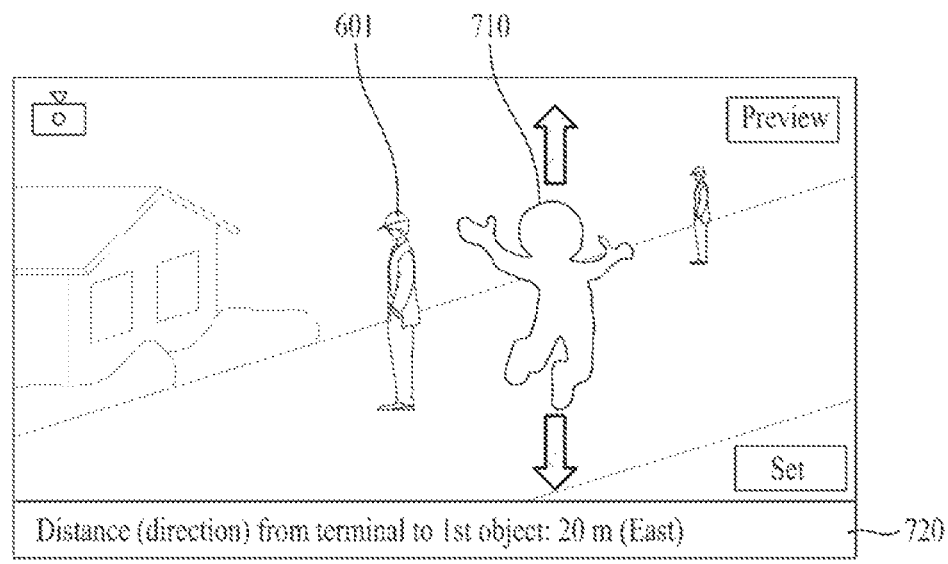
FIGS. 7A to 7C are diagrams for acquiring a distance and direction of a specific object from a terminal according to the present invention.
Figure 7B:
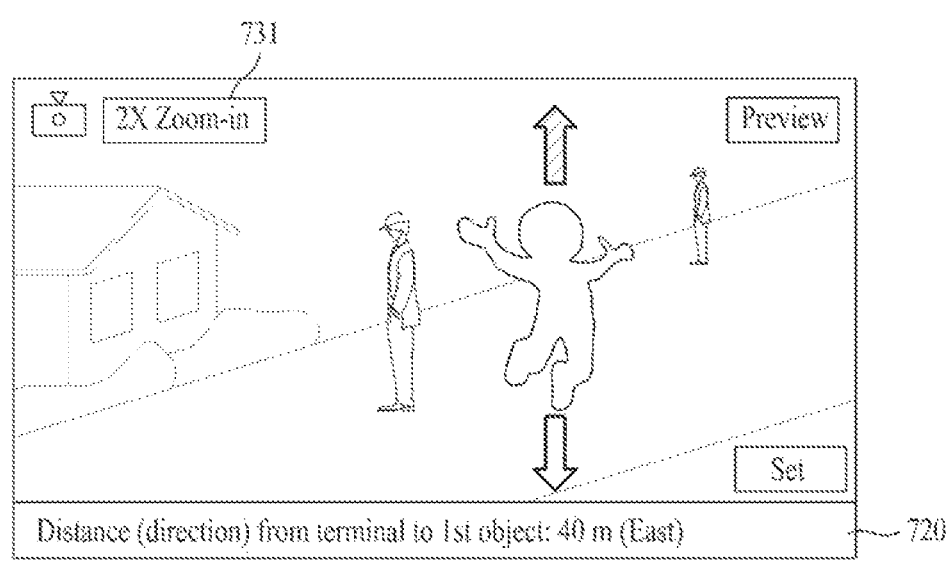
Figure 7C:
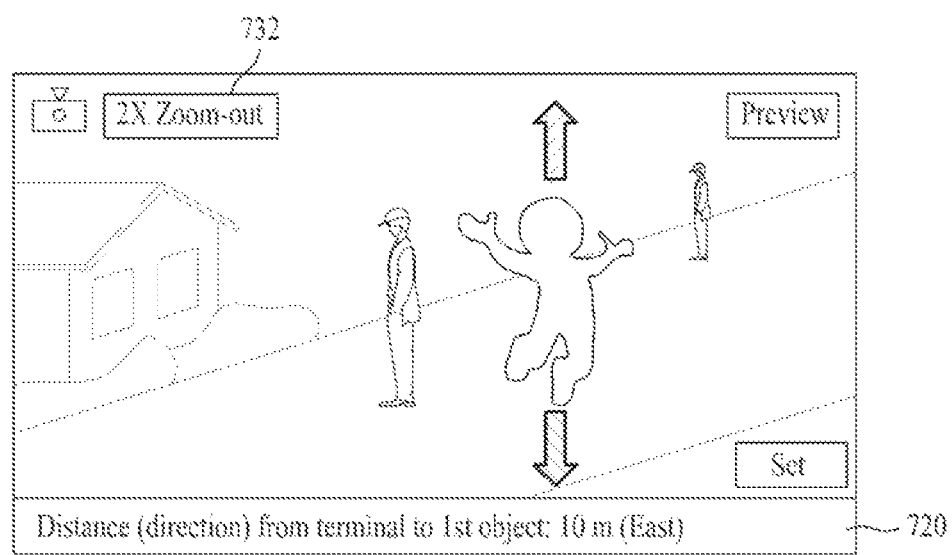

FIGS. 7A to 7C are diagrams for acquiring a distance and direction of a specific object from a terminal according to the present invention. For clarity and convenience of the following description, an object type of a specific object is a person.

Referring to FIGS. 7A to 7C, the mobile terminal 100 measures a real size of a specific object 601, of which type is a person, with reference to a standard object_person 710 and is then able to measure an actual distance from the mobile terminal 100 to the specific object 601 based on the measured real size.

In this case, the standard unit object can be set per object type and can be set to have a unit size corresponding to an actually measured size. Moreover, the standard unit object enables the actually measured size to match a same unit size differently in accordance with an area.

For instance, regarding the setting per object type, if an object type is a person, a standard unit object_person having a 1 cm unit size can be set for an actually measured size 170 cm. If an object type is a male, a standard unit object_male having a 1 cm unit size can be set for an actually measured size 175 cm. If an object type is a female, a standard unit object_female having a 1 cm unit size can be set for an actually measured size 165 cm. If an object type is an American male, a standard unit object can have a 1 cm unit size for an actually measured size 180 cm. If an object type is a Korean male, a standard unit object can have a 1 cm unit size for an actually measured size 175 cm [Regional setting].

The above-described embodiment is non-limited by the case that the object type is the person (i.e., object type_person) and is also applicable to various kinds of object types including an object type_tree (i.e., unit size vs. actually measured size can vary in accordance with a species), an object type_building (i.e., unit size can vary in accordance with the number of building floors) and the like.

A method of measuring an actual size and an actual distance of a specific object 601 having an object type set to a person is explained in detail as follows.

For clarity and convenience of the following description, assume that a standard unit object_person 710 has a unit size '1 cm' for an actual size 170 cm. Assume that a unit distance from the mobile terminal 100 is a unit distance '10 cm' if a size on a screen is 1 cm.

FIG. 7A shows that a size of a standard unit object_person 710 is adjusted into 0.5 cm to have the same size of the specific object 601. Hence, in consideration that a distance from the mobile terminal 100 is 10 m if a unit size is 1 cm, it can be observed that a distance from the mobile terminal 100 is 20 m if the size is 0.5 cm.

Therefore, the mobile terminal 100 is able to acquire a distance from the mobile terminal 100 to the object 601 for the specific object 601 having the same position and size of the standard unit object 710 on the screen. Moreover, referring to FIG. 7A, the mobile terminal 100 recognizes the direction (e.g., East, West, South, North, etc.) faced by itself from a current position and is then able to acquire the recognized direction as a direction of the specific object 601.

Referring to FIG. 7B, in case that the camera 121 enters 2× zoom-in mode 731, it looks twice closer than an actual distance. In consideration of such a fact, the mobile terminal 100 is able to acquire 40 m, which results from multiplying a distance 20 m acquired based on sizes of the standard unit object 710 and the specific object 601 on the screen by 2, as an actual distance from the mobile terminal 100 to the specific object 601.

Referring to FIG. 7C, in case that the camera 121 enters 2× zoom-out mode 732, it looks twice farther than an actual distance. In consideration of such a fact, the mobile terminal 100 is able to acquire 10 m, which results from dividing a distance 20 m acquired based on sizes of the standard unit object 710 and the specific object 601 on the screen by 2, as an actual distance from the mobile terminal 100 to the specific object 601.

In FIGS. 7A to 7C, the mobile terminal 100 is able to display the distance information and the direction information [e.g., the distance '20 m (East)' from the terminal to the first object in FIG. 7A, the distance '40 m (East)' from the terminal to the first object in FIG. 7B, the distance '10 m (East)' from the terminal to the first object in FIG. 7C] acquired for the specific object 601 on a prescribed region 720 of the screen.

Moreover, for a method of measuring an actual distance from the mobile terminal 100 to a specific object, it is able to use a plurality of objects (e.g., telegraph poles) arranged by being spaced apart from each other with a predetermined space in-between.

For instance, assuming that the number of telegraph poles arranged between the mobile terminal 100 and the specific object is 3 (i.e., 2 spaces in-between) and that a space between the telegraph poles is 5 m, an actual distance between the mobile terminal 100 and the specific object is 10 m.

FIGS. 8A to 8D are diagrams of a process for setting a position information of a specific object to metadata using a terminal position information according to the present invention. For clarity and convenience of the following description, assume that the object distance/direction information acquired in FIG. 7A is used.

Figure 8A:
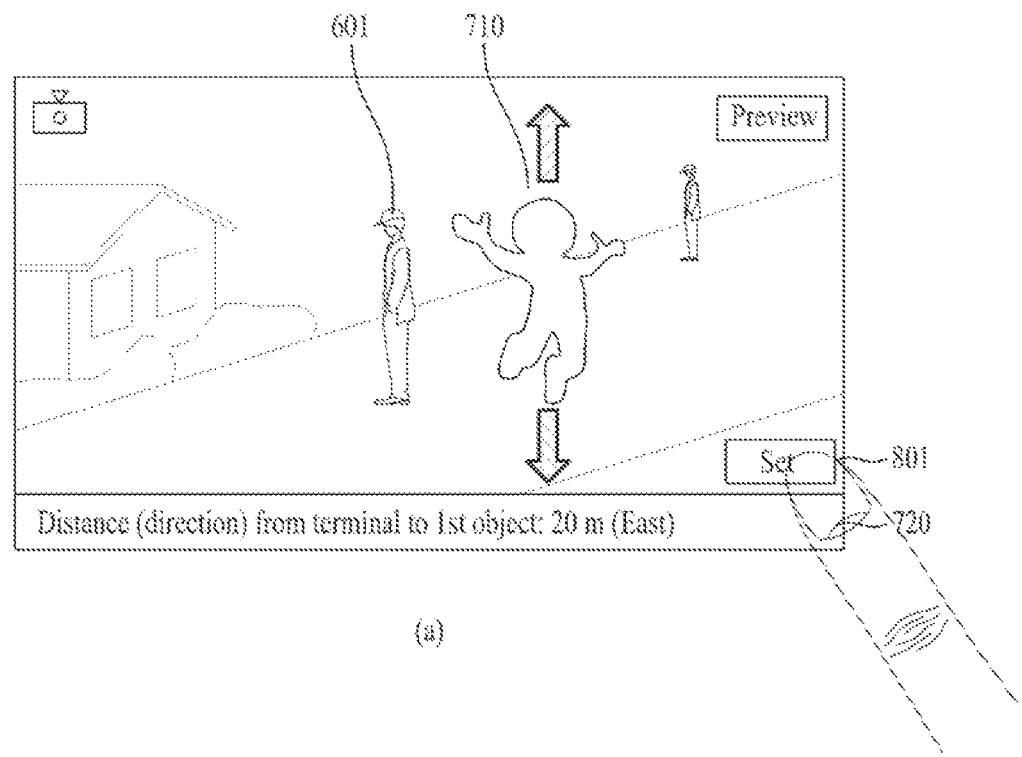
FIGS. 8A to 8D are diagrams of a process for setting a position information of a specific object to metadata using a terminal position information according to the present invention.
Figure 8A:
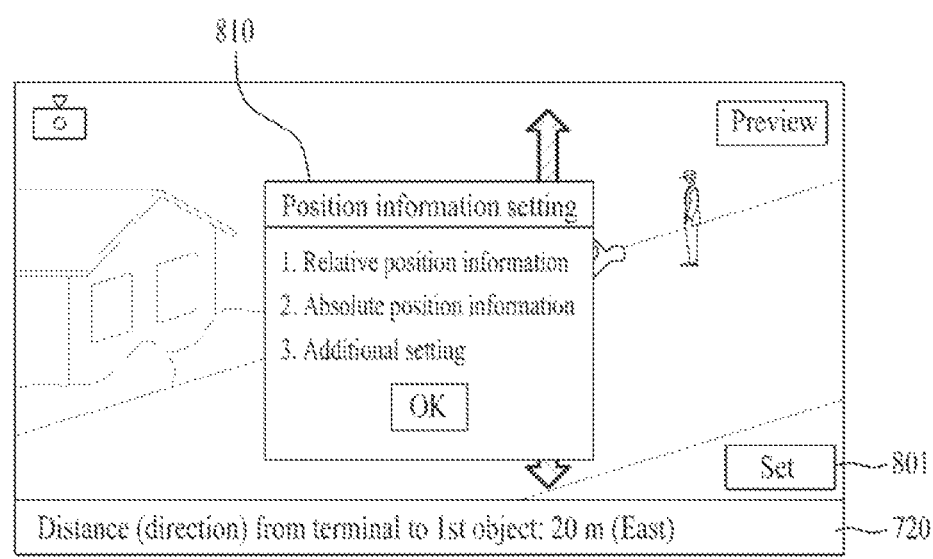

Referring to FIG. 8A, the mobile terminal 100 is provided with a zone 801 for receiving an input of a metadata setting command signal on the screen. If the zone 801 is selected, the mobile terminal 100 is able to enter a metadata settable mode [FIG. 8A (a)].

In doing so, the metadata settable mode can be entered by one of a corresponding button key selection, a corresponding menu item selection, a corresponding terminal motion detection, a corresponding voice input and the like.

As the mobile terminal 100 enters the metadata settable mode, the mobile terminal 100 is able to display a window 810 for selecting at least one of a relative position information, an absolute position information and an additional information as a position information of a specific object [FIG. 8A (b)].

In this case, the relative position information means an item for setting a relative position information of a specific object 601 for a terminal position information to a metadata, the absolute position information means an item for setting an absolute position information of a specific object 601, which is acquired based on a terminal position information, to a metadata, and the additional information can mean an item for setting metadata data on the relative position information or the absolute position information in addition.

Figure 8B:
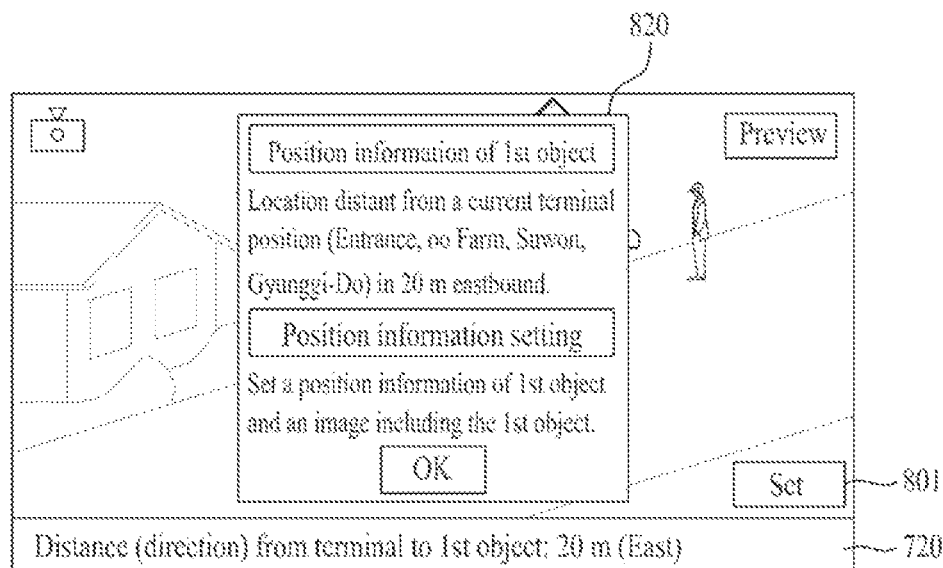

Referring to FIG. 8B, if the relative position information is selected in FIG. 8A (b), the mobile terminal 100 is able to set the relative position information [e.g., a position distance by 20 m East from a current terminal position (Entrance, oo Farm, Suwon, Gyunggi-Do)] of the specific object 601 for the terminal position information to a metadata of the specific object 601.

Figure 8C:
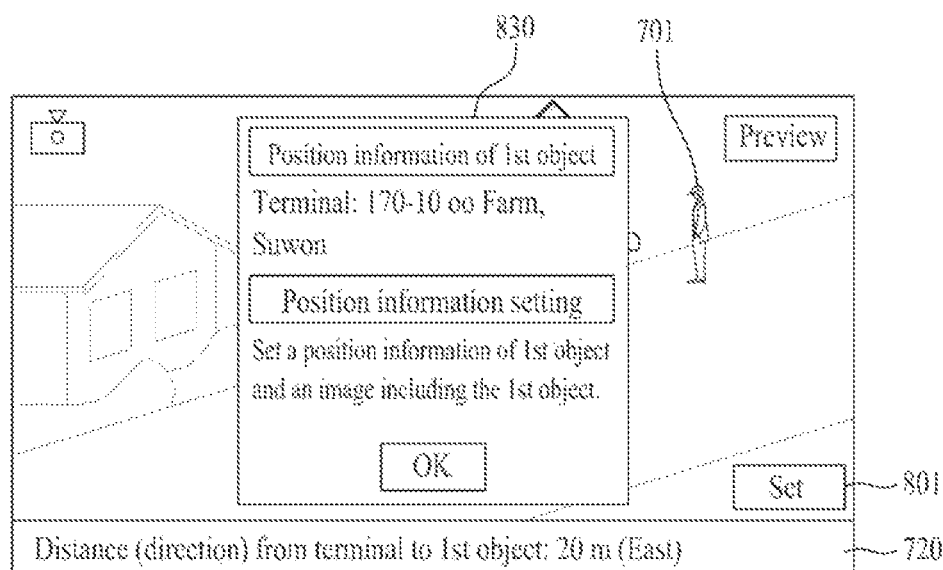

Referring to FIG. 8C, if the absolute position information is selected in FIG. 8A (b), the mobile terminal 100 is able to set the absolute position information (e.g., 170-10, oo Farm, Suwon, Gyunggi-Do) of the specific object 601, which is acquired based on the absolute position information (example of the terminal position information), to a metadata of the specific object 601.

Figure 8D:
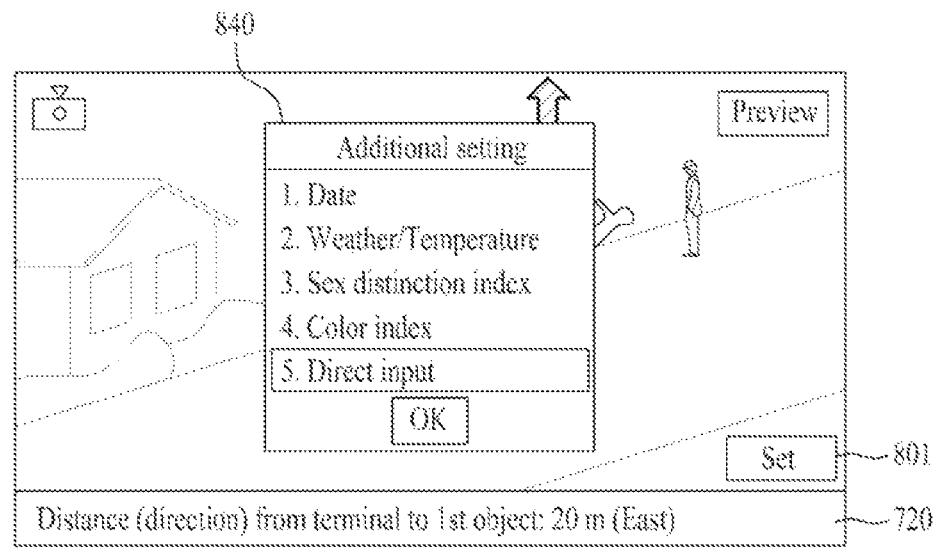
Figure 8D:
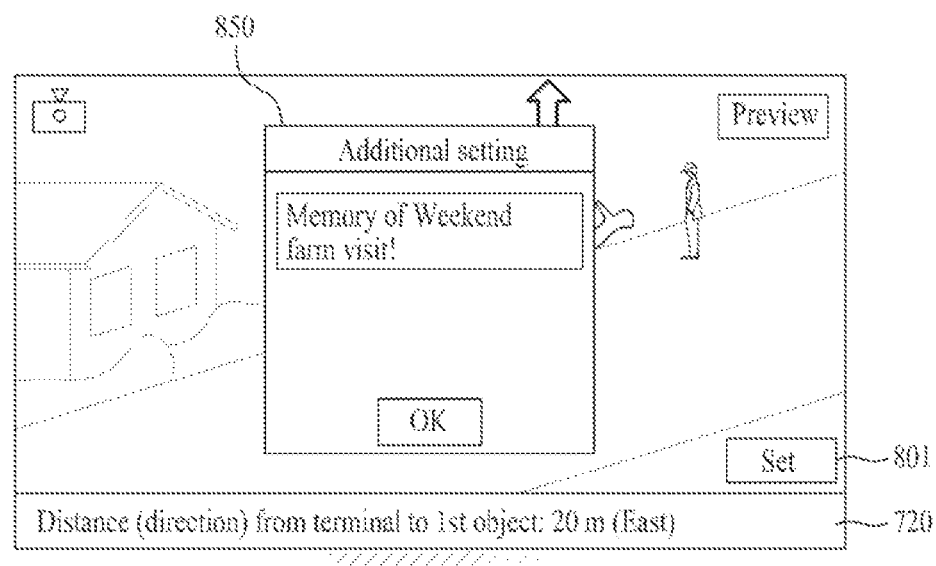

Referring to FIG. 8D, if the additional setting is selected in FIG. 8A (b), the mobile terminal 100 is able to further set a metadata about the specific object 601 in addition to the relative or absolute position information of the specific object 601.

For instance, the mobile terminal 100 displays a list 840 including audible metadata types [FIG. 8D (a)]. If 'direct input' is selected from the list 840, the mobile terminal 100 is able to further set comment information directly inputted by a user to a metadata for the specific object 601 [FIG. 8D (b)]. If a specific metadata type is selected from the list 840, the mobile terminal 100 is able to set a metadata corresponding to the specific metadata type in addition.

According to a second embodiment, the mobile terminal 100 displays a virtual image corresponding to a position information of the displayed image (cf. S410), maps a specific object related information among at least one or more object related informations included in the displayed virtual image to a specific object, and is then able to set the mapped specific object related information to a metadata of the specific object, under the control of the controller 180.

The mobile terminal 100 partitions a screen into a plurality of regions including a first region and a second region and then displays an image corresponding to S410 and a virtual image on the first region and the second region, respectively [1]. Alternatively, the mobile terminal 100 is able to display at least one object related information on the image displayed in the step S410 in a manner of mapping the at least one object related information to the displayed image [2]. In doing so, the object related information or the virtual image including the object related information can be received from an external server. Moreover, a virtual image application can be loaded in the mobile terminal 100.

Specifically, in case of displaying the preview image in the step S410, the mobile terminal 100 is able to display the preview image in a manner of mapping the object related information onto the preview image. In particular, the preview image itself is able to play a role of a virtual image. In doing so, the object related information can be displayed at a point where an object corresponding to the object related information is supposed to be situated within the preview image.

The second embodiment is described with reference to FIG. 9A and FIG. 9B as follows. For clarity and convenience of the following description, assume that at least one or more object related informations are displayed on the preview image. In this case, assume that the corresponding preview image plays a role as a virtual image.

Figure 9A:
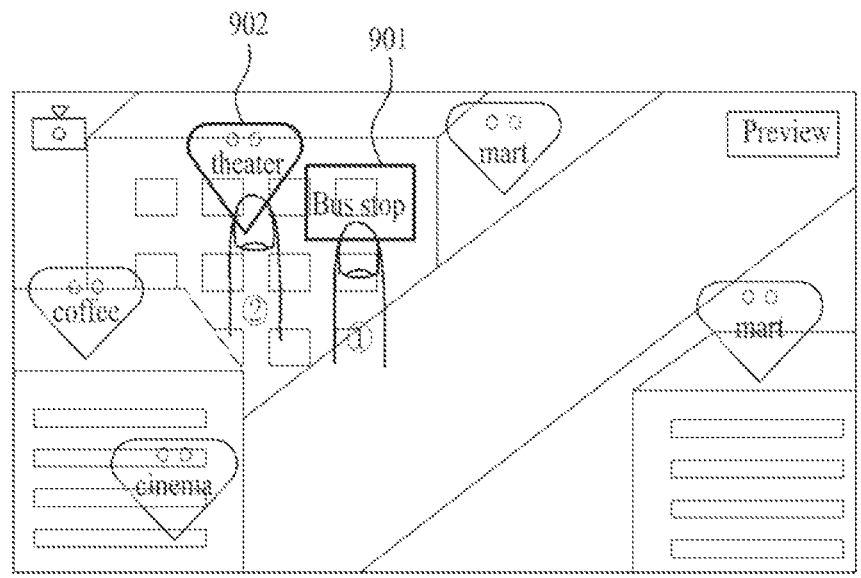
FIGS. 9A to 9C are diagrams of a process for setting a specific object related information included in a virtual image to metadata according to the present invention.
Figure 9B:
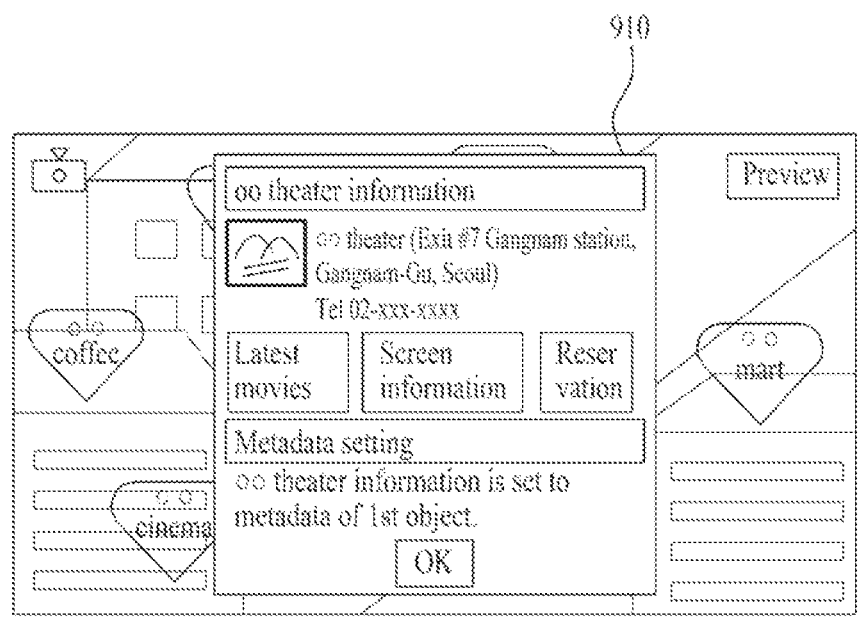
Figure 9C:
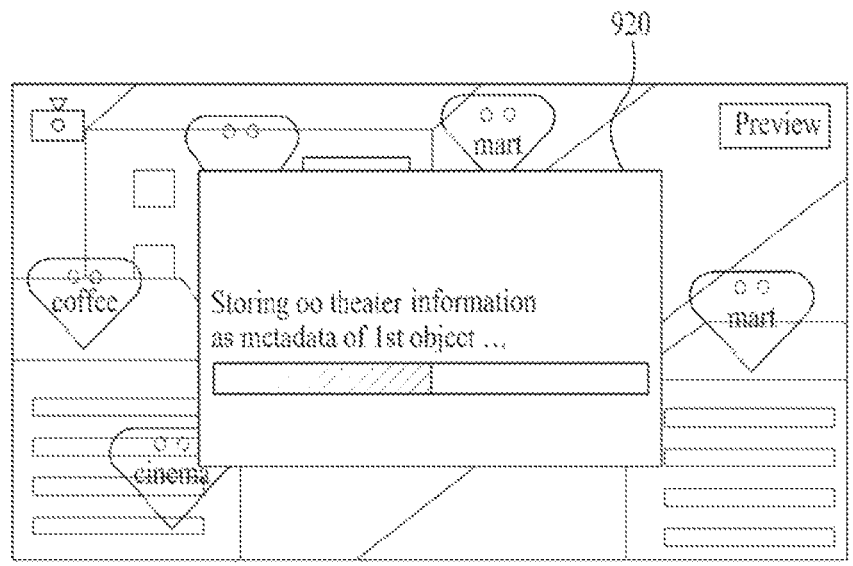
Figure 9C:
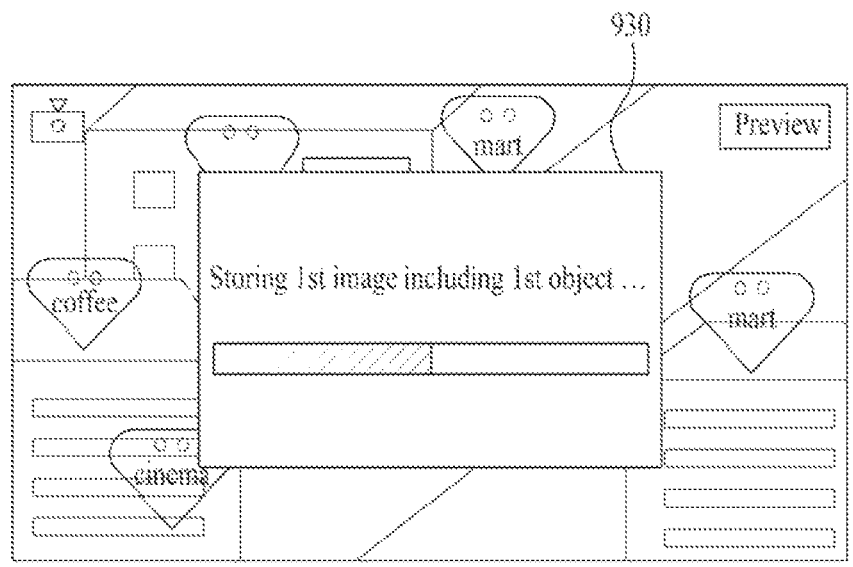

FIGS. 9A to 9C are diagrams of a process for setting a specific object related information included in a virtual image to metadata according to the present invention.

Referring to FIG. 9A, the mobile terminal 100 displays a plurality of object related informations on a preview image and is then able to receive an input of a touch action ①  on a specific object 901 and an input of a touch action ② on a specific object related information 902.

For instance, the object related information can be displayed in a manner of being linked with a corresponding object if the corresponding object is included in the preview image. In particular, the object related information can be displayed at a point where the corresponding object is supposed to be situated.

Moreover, the object related information displayed within the virtual image can be limited to a representative information (e.g., a name, a phone number, etc.) among various kinds of informations on the corresponding object. And, various kinds of informations (e.g., a name of the corresponding object, a phone number, a position information, a website address, a path information, opinion informations of users, etc.) corresponding to a selection of the object related information can be displayed as well.

Referring to FIG. 9B, the mobile terminal 100 is able to set the specific object related information to a metadata of the specific object 901. In doing so, the mobile terminal 100 is able to set various information (e.g., a phone number, a position information, a website address information, etc.) associated with the specific object related information 902 to the metadata of the specific object 901 as well as the specific object related information 902 (e.g., name information) displayed on the screen. The mobile terminal 100 may display announcement information 910 indicating that the specific object related information is set to the metadata of the specific object 901. With reference to FIG. 9C(a), the mobile terminal may display progress announcement information 920 regarding performing setting of metadata. The mobile terminal may also store the image including the specific object, and display announcement information 930 as shown in FIG. 9C(b).

According to a third embodiment, the mobile terminal 100 acquires a position information of an object situated within a predetermined distance from a specific object and is then able to set the acquired position information to a metadata of the specific object, under the control of the controller 180.

In doing so, the controller 180 sets a position information of an object situated closest to the specific object to the metadata of the specific object or is able to set a position information of an object selected by a user from a list of objects having their position information exist to the metadata of the specific object.

The third embodiment is described with reference to FIGS. 10A to 10C as follows.

Figure 10A:
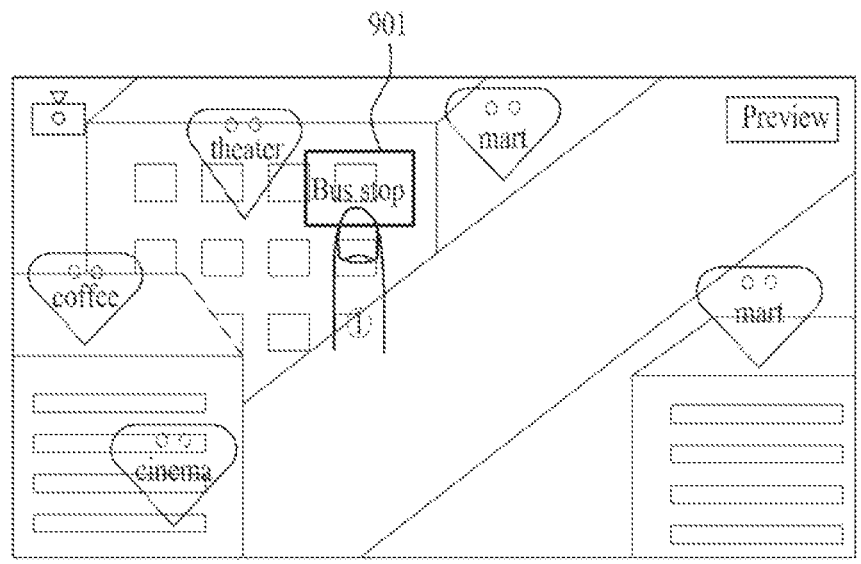
FIGS. 10A to 10C are diagrams of a process for setting a position information of an object located within a predetermined distance from a specific object to metadata according to the present invention.
Figure 10B:
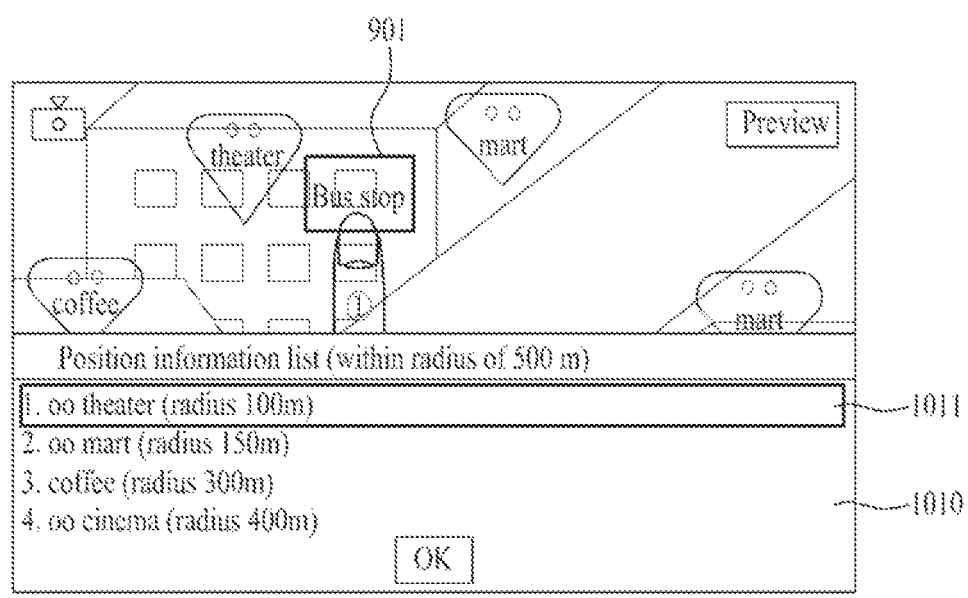
Figure 10C:
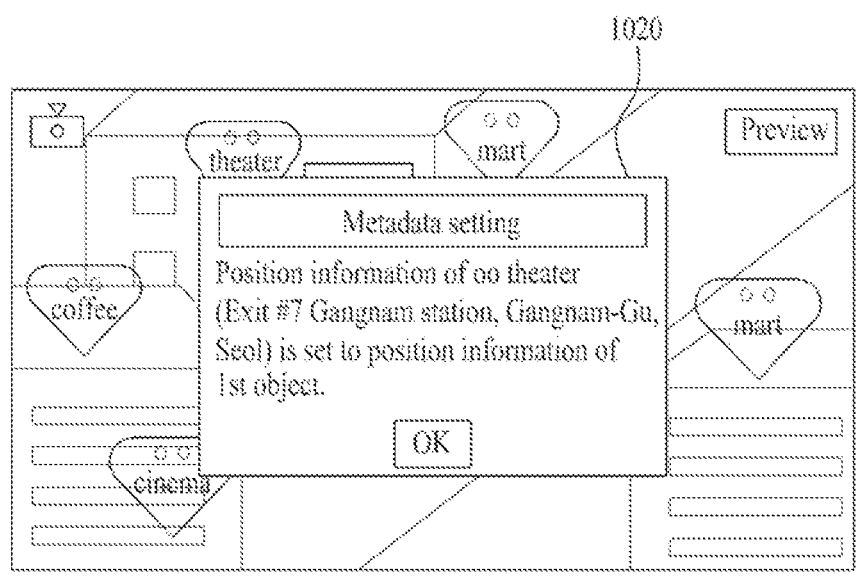

FIGS. 10A to 10C are diagrams of a process for setting a position information of an object located within a predetermined distance from a specific object to metadata according to the present invention.

Referring to FIG. 10A and FIG. 10B, if a user selects a specific object 901 from a displayed image [FIG. 10A], the mobile terminal 100 is able to display a list 1010 including a plurality of objects situated within a predetermined radius from the specific object 901 [FIG. 10B]. In this case, the predetermined radius from the specific object 901 can mean a predetermined radius from the mobile terminal 100.

For instance, the list 100 is able to include an object, of which position information (e.g., address information) is acquired, among the objects situated within a previously designated distance from the specific object 901. In doing so, the mobile terminal 100 is able to receive the position information of each of the objects situated within the predetermined radius with reference to a terminal position information from an external server.

Referring to FIG. 10C, if 'oo theater (radius 100 m)' 1011 is selected from the list 1010 shown in FIG. 10B, the mobile terminal 100 is able to set the position information of the oo theater to the metadata of the specific object 901. In doing so, the mobile terminal 100 is able to display an announcement information 1020 indicating that the position information of the oo theater is set to the metadata of the specific object 901.

According to a fourth embodiment, the mobile terminal 100 searches the data stored in an external server (not shown in the drawing) with a search condition set to a specific object and is then able to set the data found corresponding to the search condition to a metadata for the specific object, under the control of the controller 180. In this case, the external server is the server existing on a network. The external server includes a web server linked to a website and is also able to include the content managing server 220. Moreover, a text displayed around the specific object or the like is usable as the search condition as well as the specific object.

In particular, the mobile terminal 100 transmits a data search request signal including a search condition set to a specific object to the external server and is then able to receive a data found with the search condition set to the specific object from the external server. Alternatively, the mobile terminal 100 accesses the external server and is then able to search a database of the external server for the data having the search condition set to the specific object.

Meanwhile, irrespective of the external server, the mobile terminal 100 searches the data stored in the memory 160 with a search condition set to a specific object and is then able to set the data, which is found to correspond to the search condition, to the metadata for the specific object.

The fourth embodiment is described with reference to FIGS. 11A to 11C as follows. For clarity and convenience of the following description, assume that an external server is a web server.

Figure 11A:
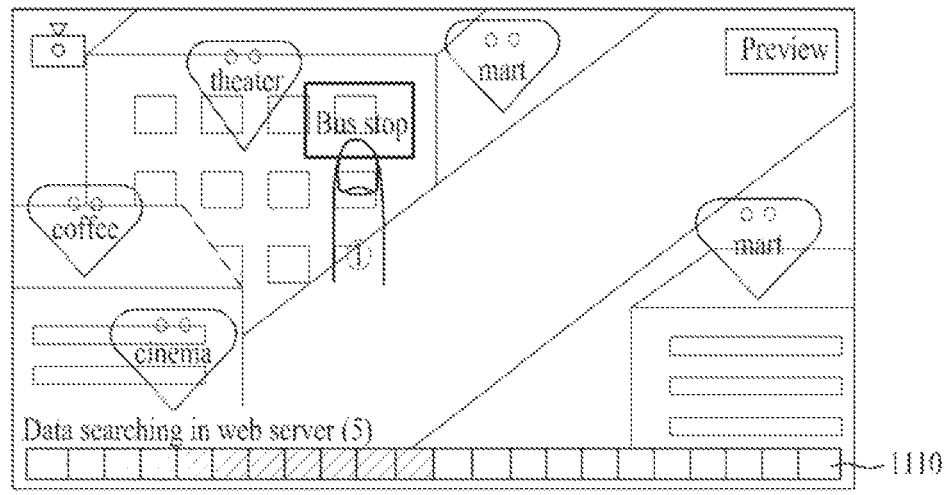
FIGS. 11A to 11C are diagrams of a process for setting a data found with a search condition for a specific object to metadata according to the present invention.
Figure 11B:
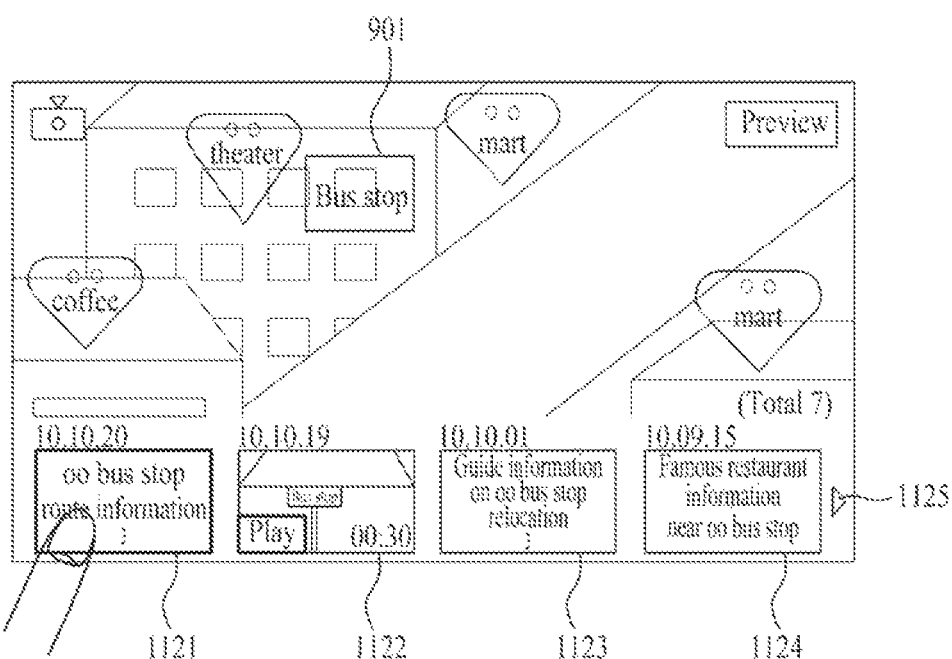
Figure 11C:
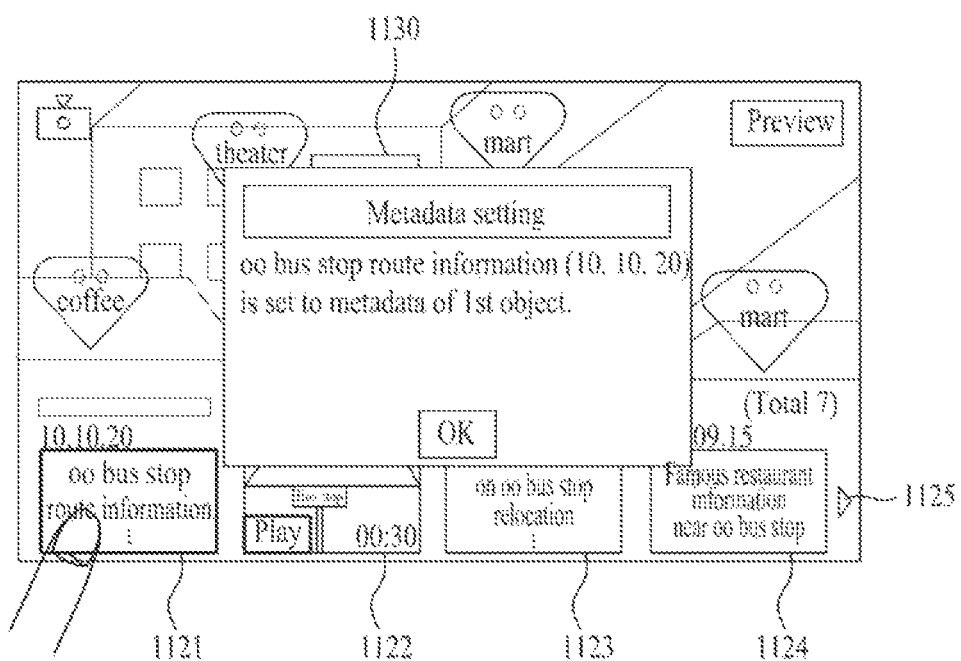

FIGS. 11A to 11C are diagrams of a process for setting a data found with a search condition for a specific object to metadata according to the present invention.

Referring to FIG. 11A, if a user selects a specific object 901 from a displayed image, the mobile terminal 100 accesses a web server that provides data and is then able to search a database of the server with a search condition set to the specific object 901.

In doing so, an information 1110 indicating a search status (e.g., a search speed, a search rate, a searched data number, etc.) can be displayed on a prescribed region of the screen.

Moreover, the web server accessed in case of the selection of the specific object 901 is designated by a user or terminal in advance or can be selected by a user in a manner of providing a web server list to the user in case of the selection of the specific object 901.

Referring to FIG. 11B, in case that the search process shown in FIG. 11A is completed, the mobile terminal 100 is able to display a predetermined number of search data 1121 to 1124 on a prescribed region of the screen. For instance, if the specific object 901 is a specific bus stop, the search data can include a bus route information of the specific bus stop, an image file including the specific bus stop, a position move information of the specific bus stop, a famous restaurant information near the specific bus stop, a website address information corresponding to the specific bus stop, a position information (e.g., a position information by GPS or WPS) of the specific bus stop, a weather information of the specific bus stop and the like. These examples of the search data are just exemplary and the search data can further include more various informations (e.g., a time information, a comment information, a metadata set on the search data, etc.).

Moreover, if a data turning key 1125 is selected, the mobile terminal 100 is able to display a search data in order next to the currently displayed search data on the screen. Of course, the previously found search data can be displayed on a prescribed region of the screen in the course of the search process as well as after the completion of the search process.

Referring to FIG. 11C, if 'specific data' 1121 is selected in FIG. 11B, the mobile terminal 100 is able to set the specific data 1121 to a metadata of the specific object 901. Of course, all search data found with the search condition set to the specific object 901 can be set to the metadata. Moreover, the mobile terminal 100 is able to display an announcement information 1130 indicating that the specific search data 1121 is set to the metadata of the specific object 901.

According to a fifth embodiment, the mobile terminal 100 displays a map image corresponding to the position information of the image displayed in the displaying step S410, maps a specific one of at least one or more object informations included in the map image to a specific object, and is then able to set the mapped specific object information to a metadata of the specific object, under the control of the controller 180.

In this case, the position information of the image can include a coordinates information, an address information, a POI (point of interest) information or the like, which corresponds to an area or place indicated by the image. In order to acquire the position information of the image, the mobile terminal 100 searches the position information per place (or area) image stored in the memory 160 for a position information corresponding to a currently displayed image or is able to receive a position information corresponding to a currently displayed image from an external server in response to a request made by the mobile terminal 100.

The map image is able to include a satellite photograph image, a terrain image and the like. In order to acquire a map image corresponding to a position information of an image, the mobile terminal 100 searches a per-position information map image stored in the memory 160 or is ale to receive the map image from an external server in response to a request made by the mobile terminal 100 (i.e., the mobile terminal 100 transmits a request signal including the position information of the image).

The object information included in the map image is the information on an object (e.g., such a thing having an address as a building, a place and the like) situated in an area corresponding to the map image and is able to include a name information, a phone number, a route information, a position information (e.g., address information, POI information, etc.) and the like for example.

In displaying an image including a specific object and a map image including a specific object information, the mobile terminal 100 partitions a screen into a plurality of regions and then displays the image and the map image on the corresponding regions, respectively [1]. Alternatively, the mobile terminal 100 displays the image on a whole screen and also displays the map image on a popup window [2]. Alternatively, the mobile terminal 100 displays the image as a background and also displays the map image as a foreground (i.e., the image is displayed as the foreground after selection of the specific object information) [3].

Regarding the mapping to a specific object of a specific object information, the controller 180 determines an object situated at a position equal or similar to the specific object and the mobile terminal 100 maps an object information of the determined object to the specific object as the specific object information [1]. Alternatively, the mobile terminal 100 is able to map the specific object information selected by a user to the specific object [2].

Moreover, assuming that the displayed image is a preview image, when an image is photographed as a still image, the photographed image and a corresponding map image can be stored together. When an image is photographed as a video, the photographed image and a corresponding map image can be recorded together. After completion of the storage or recording, it is able to perform a mapping operation of a specific object information on a specific image using the image and the corresponding map image together.

Moreover, as mentioned in the foregoing description, the map image including the specific object information can be set to the metadata for the specific object as well as the specific object information.

The fifth embodiment is described with reference to FIG. 12A and FIG. 12B as follows.

Figure 12A:
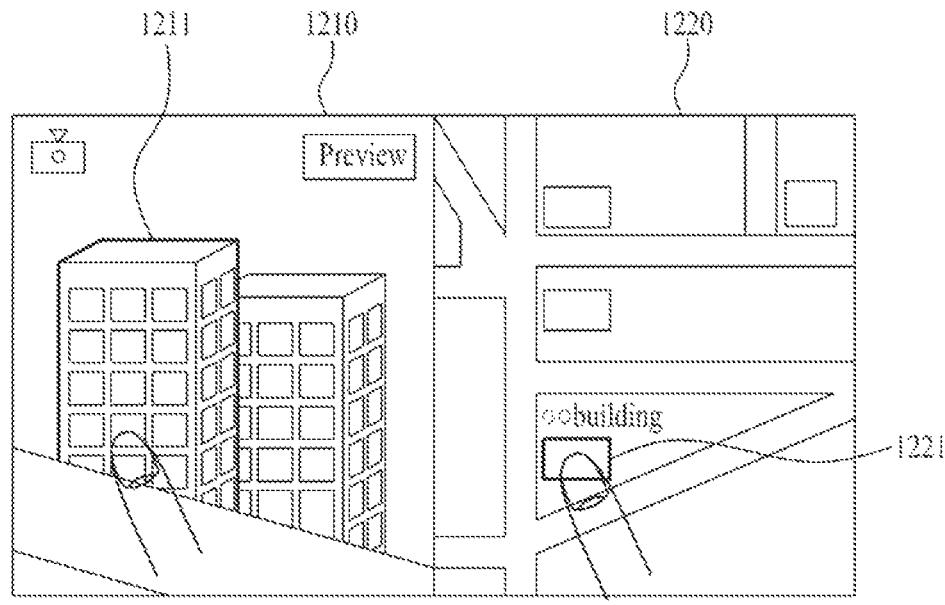
FIG. 12A and FIG. 12B are diagrams of a process for setting a specific object information included in a map image to metadata according to the present invention.
Figure 12B:
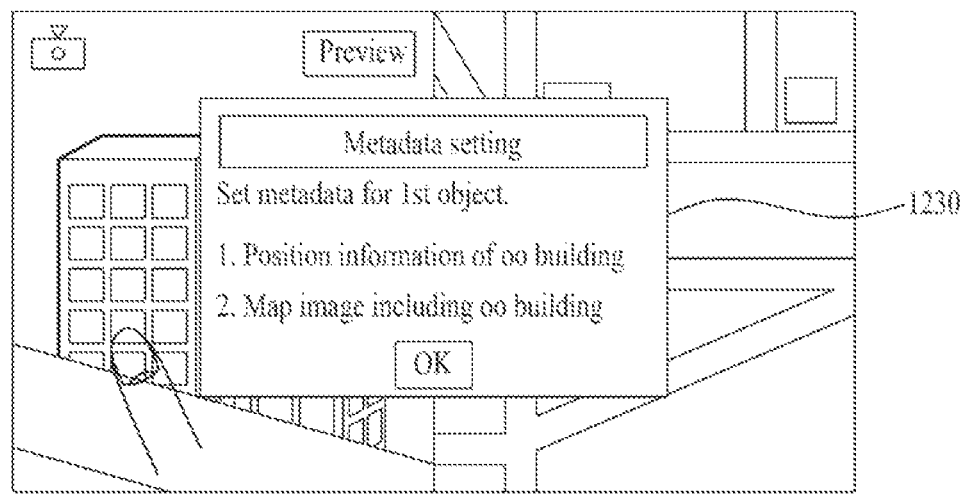

FIG. 12A and FIG. 12B are diagrams of a process for setting a specific object information included in a map image to metadata according to the present invention.

Referring to FIG. 12A, the mobile terminal 100 displays a preview image and a satellite photograph image on a first region 1210 and a second region 1220, respectively, and is then able to receive a first touch action on a specific object 1211 included in the preview image and a second touch action on a specific object information 1221 included in the satellite photograph image from a user. In doing so, the first touch action and the second touch action can be inputted sequentially or simultaneously.

Referring to FIG. 12B, the mobile terminal 100 is able to display a window 1230 for selecting at least one of the specific object information 1221 and the satellite photograph image including the specific object information 1221 as a metadata for the specific object 1211.

Therefore, the mobile terminal 100 is able to set the at least one of the specific object information 1221 and the satellite photograph image including the specific object information 1221 to the metadata of the specific object 1211 in accordance with a selection made by a user.

According to a sixth embodiment, in case of video-taking the displayed image using the camera 121, the mobile terminal 100 obtains a motion pattern of a specific object during a predetermined period of time and is then able to set the obtained motion pattern to a metadata of the specific object, under the control of the controller 180. In this case, comparing to POI, the motion pattern can be called MOI (motion of interest). In order to obtain the motion pattern of the specific object, the controller 180 is able to use the aforesaid image recognition technology.

The sixth embodiment is described in detail with reference to FIG. 13A and FIG. 13B as follows.

Figure 13A:
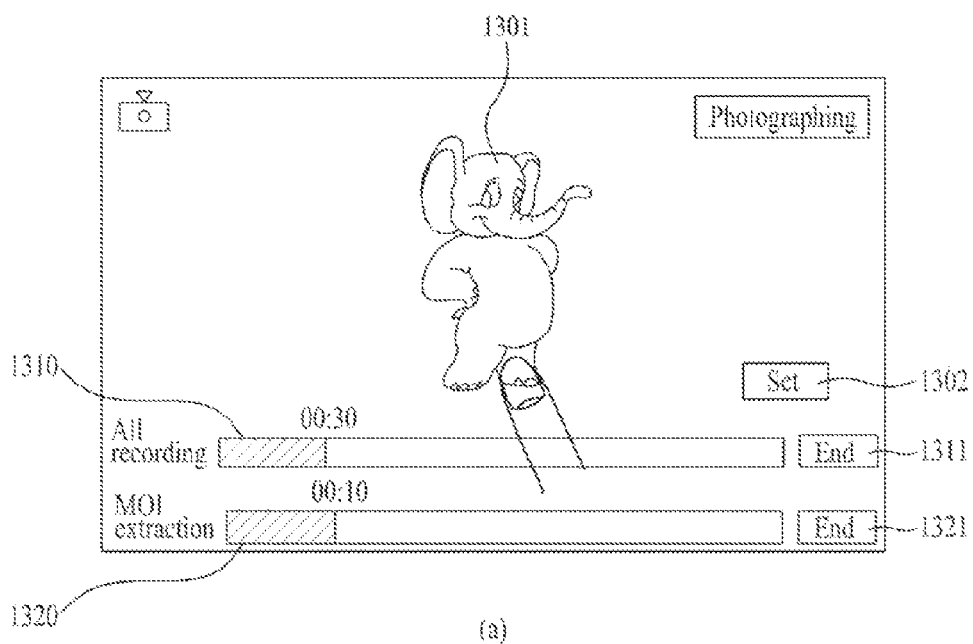
FIG. 13A and FIG. 13B are diagrams of a process for setting a motion information of a specific object to metadata according to the present invention.
Figure 13A:
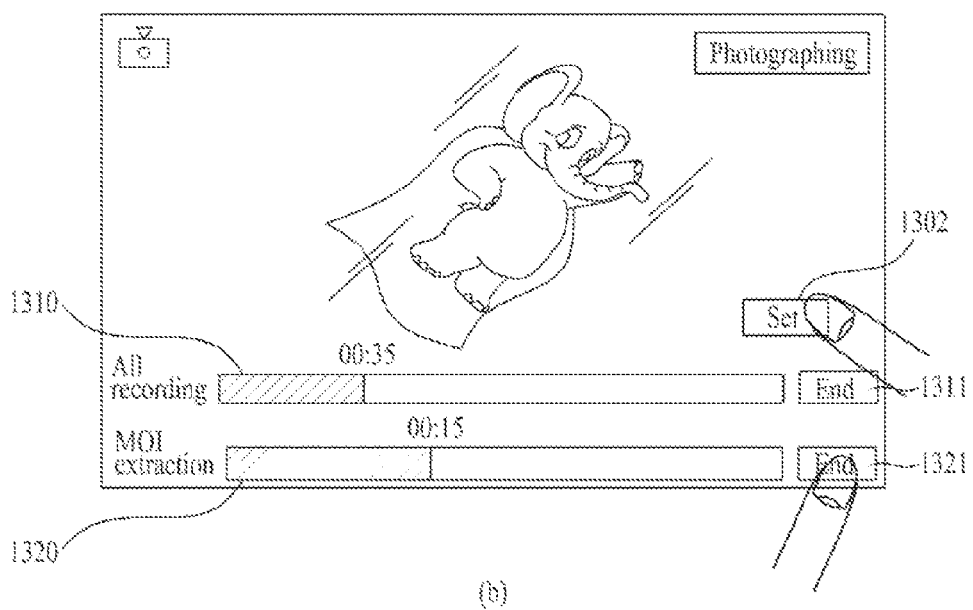
Figure 13B:
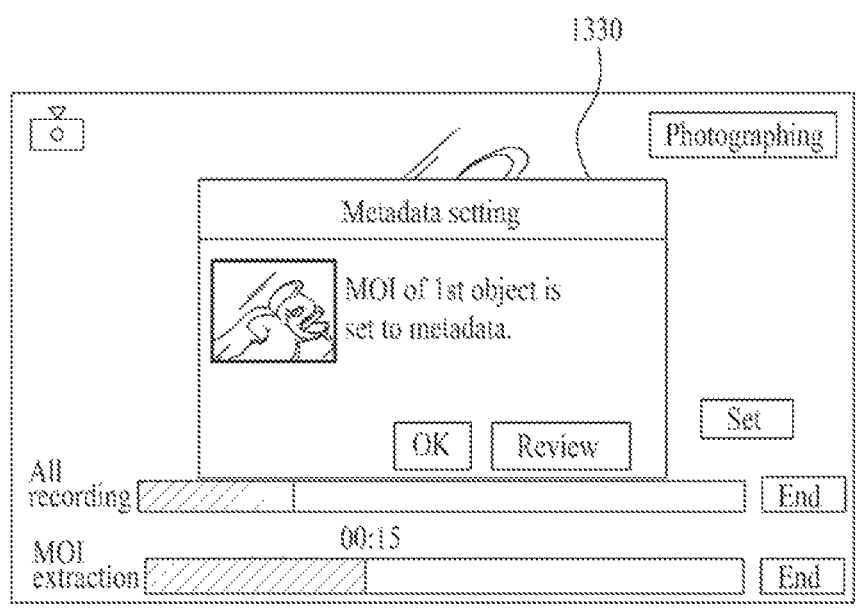

FIG. 13A and FIG. 13B are diagrams of a process for setting a motion information of a specific object to metadata according to the present invention.

Referring to FIG. 13A, in case of receiving an input of a touch action on a specific object 1301 in the course of a video photographing, the mobile terminal 100 starts to recognize a motion pattern of the specific object 1301 [FIG. 13A (a)]. In doing so, a bar 1310 indicating a video taken time and a bar 1320 indicating a motion pattern (MOI) recognized time can be displayed on a prescribed region of the screen. Alternatively, a motion pattern recognized time can be identifiably displayed on the bar 1310 indicating the video taken time.

If a user selects an end key 1321 of the motion pattern recognition, the mobile terminal stops the motion pattern recognizing operation. If a metadata setting key 1302 is selected by a user, the mobile terminal 100 is able to set the motion pattern of the specific object 1301, which is recognized during a predetermined period of time, to a metadata of the specific object 1301.

Referring to FIG. 13B, the mobile terminal 100 is able to display an information 1330 indicating that the motion pattern of the specific object 1301 is set to the metadata of the specific object 1301.

According to a seventh embodiment, in the course of playing (or taking) a video, the mobile terminal 100 is able to set a mark information on a specific partial video of a whole video to a metadata of the corresponding video or the specific partial video under the control of the controller 180. Moreover, the mobile terminal 100 is able further set a comment information on the specific partial video marked by the mark information to a metadata.

The seventh embodiment if described in detail with reference to FIGS. 14A to 14C as follows.

Figure 14A:
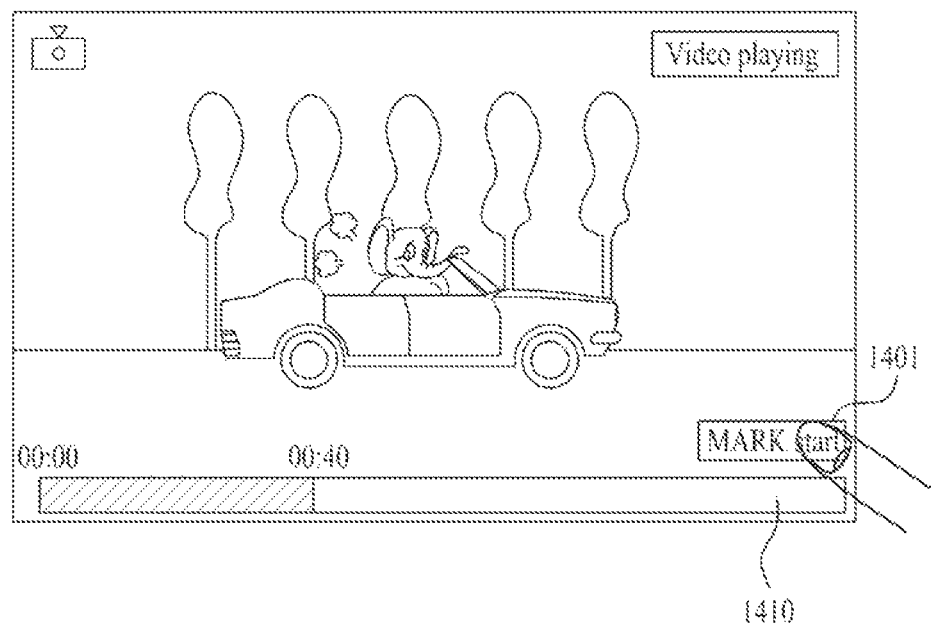
FIGS. 14A to 14C are diagrams of a process for setting a mark information on a video to metadata according to the present invention.
Figure 14B:
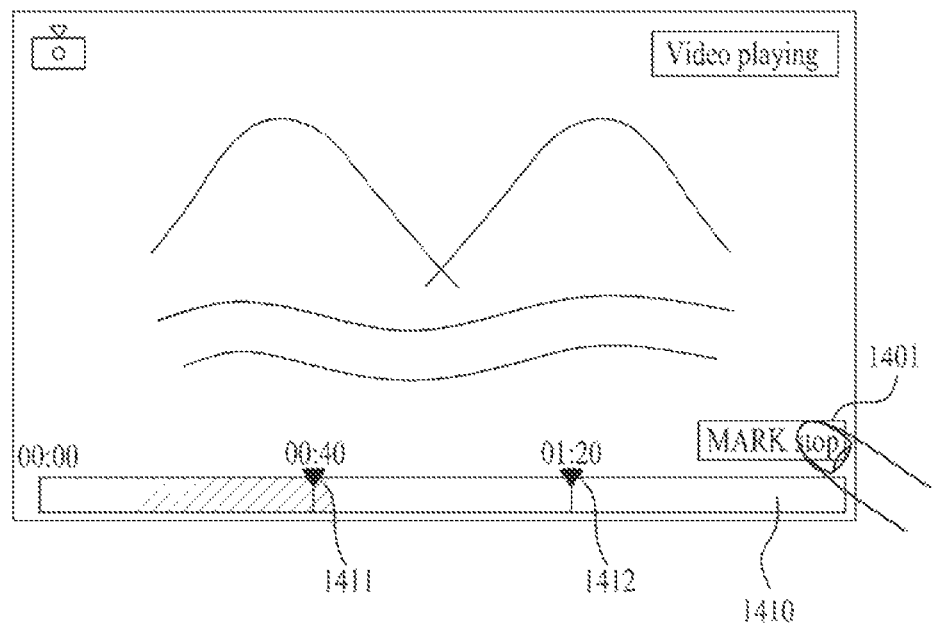
Figure 14C:
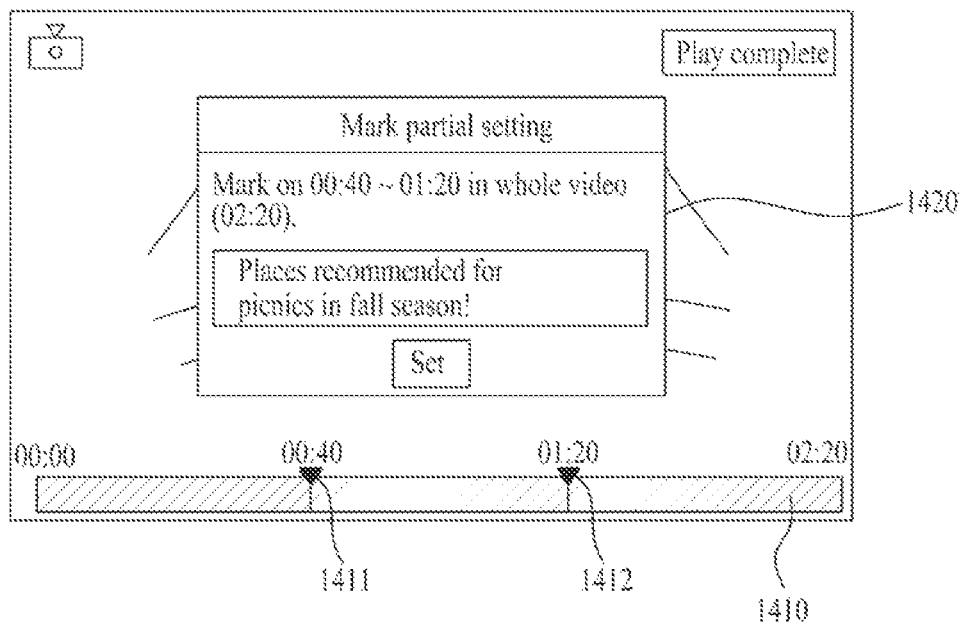

FIGS. 14A to 14C are diagrams of a process for setting a mark information on a video to metadata according to the present invention.

Referring to FIG. 14A, the mobile terminal 100 reeves an input of a user selection action on a mark start key 1401 at a first play point in the touches of playing a video and is then able to set the first play point to a mark start point.

Referring to FIG. 14B, while the video play is maintained in FIG. 14A, the mobile terminal 100 receives an input of a user selection action on a mark end key 1401 at a second play point and is then able to set the second play point to a mark end point.

Moreover, on a bar 1410 indicating a video play progress, the first play point 1411 and the second play point 142 can be identifiably displayed. Besides, the key 1401 plays a role as the mark start key before the mark start and also plays a role as the mark end key after the mark start.

Therefore, the mobile terminal 100 marks a partial video belonging to the second play point at the first play point and is then able to set the mark information on the marked partial video (e.g., the first play point information and the second play point information are included) to a metadata for the whole video or the marked partial video.

Referring to FIG. 14C, the mobile terminal 100 is able to further set a comment information on the marked partial video to metadata. Of course, metadata of various types including a metadata as a weather information, a time information, an uploader information and the like can be further set to the metadata.

According to an eighth embodiment, the mobile terminal 100 searches a phonebook or a photo album (or a gallery) for an image including an object equal to similar to a specific object included in a displayed image under the control of the controller 180. If the search is successful, the mobile terminal 100 is able to set a counterpart information corresponding to the image found from the phonebook or the image found from the photo album to a metadata for the specific object.

The mobile terminal 100 provides the memory 160 with a first storage region allocated to the phonebook and a second storage region allocated to the photo album separately. The mobile terminal 100 stores the image or counterpart information, which is stored in association with the phonebook, in the first storage region. And, the mobile terminal 100 is able to store the image stored in association with the photo album in the second storage region.

For instance, the displayed image can include a still image or a video. In case of the still image, the displayed image means a still image already taken via the camera 121 or a still image provided by the content managing server 220. In case of the video, the displayed image can mean a video, which is being taken or already taken via the camera 121, or a video provided by the content managing server 220.

The eighth embodiment is described in detail with reference to FIGS. 15A to 15E as follows.

FIGS. 15A to 15E are diagrams of a process for setting a counterpart information related to a specific object to metadata according to the present invention.

Figure 15A:
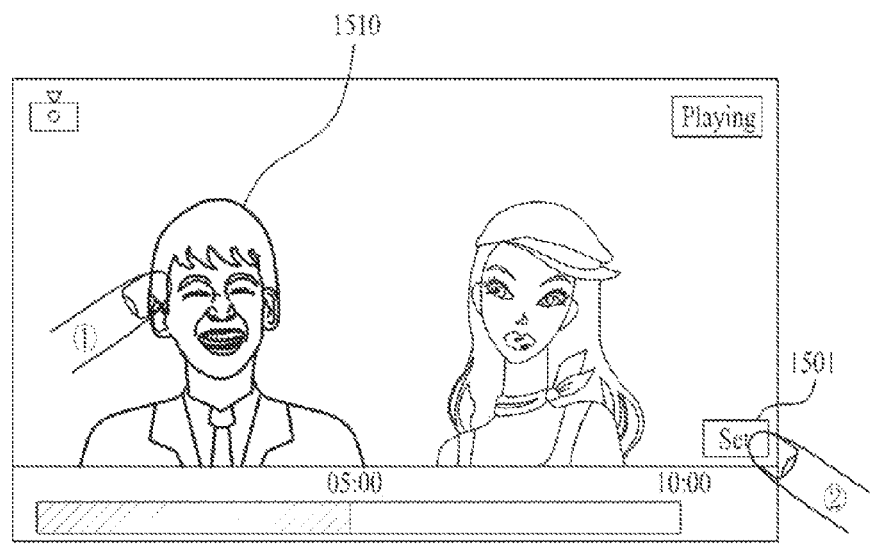
FIGS. 15A to 15E are diagrams of a process for setting a counterpart information related to a specific object to metadata according to the present invention.

Referring to FIG. 15A, in the course of playing a video, the mobile terminal 100 is able to separately receive an input of a first touch action on a specific object 1510 and an input of a second touch action on a metadata setting key 1501.

Figure 15B:
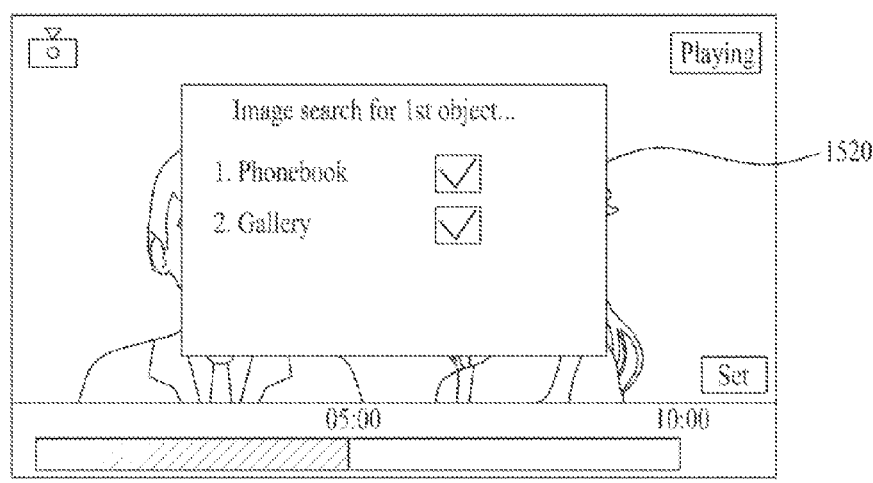

Referring to FIG. 15B, if the mobile terminal 100 receives the inputs of the first and second touch actions, it is able to display a window 1520 for enabling a user to select whether to search a phonebook or a gallery for an image including an object equal to similar to the specific object 1510.

Figure 15C:
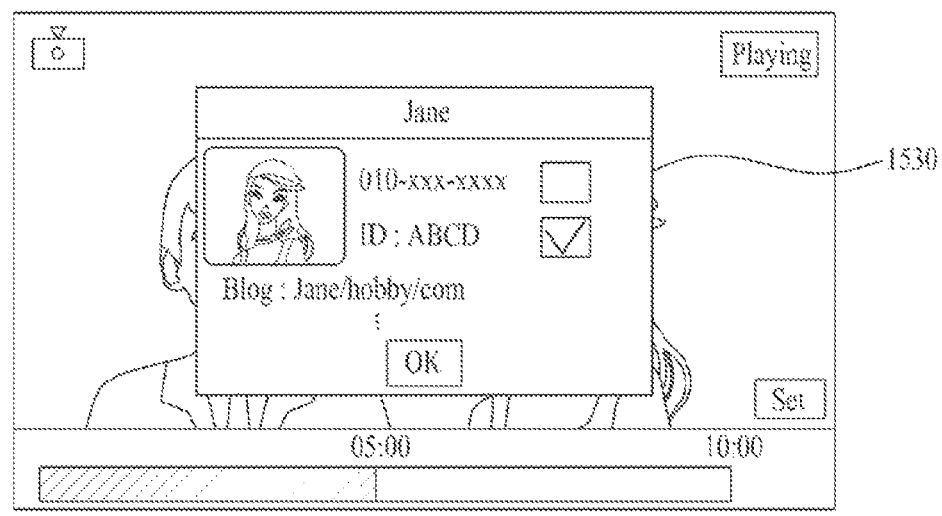

Referring to FIG. 15C, if the phonebook is selected in FIG. 15B, the mobile terminal 100 searches images stored by being linked with the phonebook for the image including the object equal or similar to the specific object 1510 and is then able to display a counterpart information corresponding to the found image on the screen.

Figure 15D:
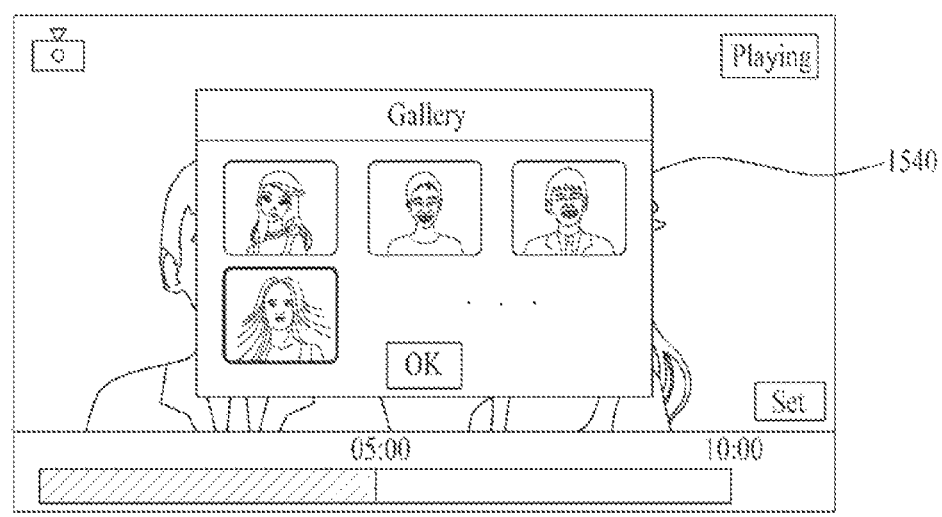

Referring to FIG. 15D, if the gallery is selected in FIG. 15B, the mobile terminal 100 searches images stored by being linked with the gallery for the image including the object equal or similar to the specific object 1510 and is then able to display the found image on the screen.

Figure 15E:
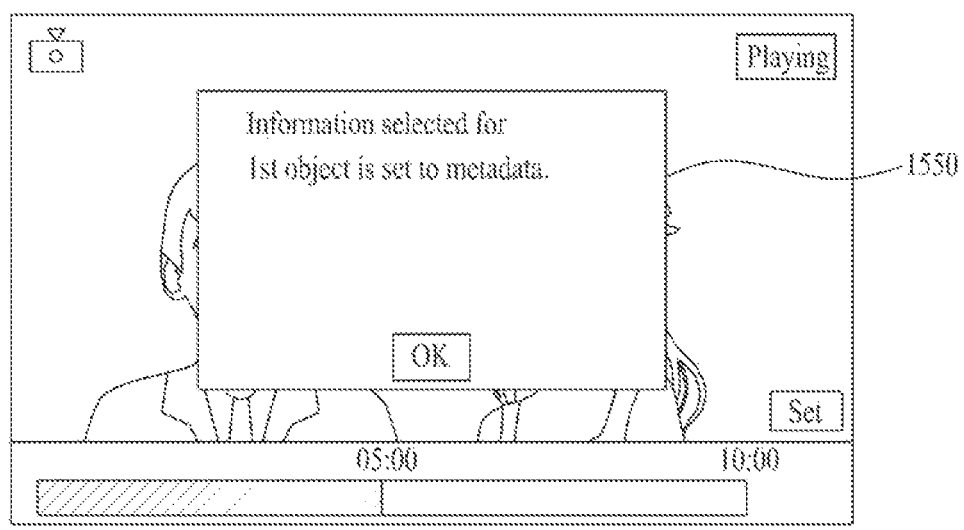

Referring to FIG. 15E, the mobile terminal 100 is able to set the counterpart information corresponding to the found image in FIG. 15C or the found image in FIG. 15D to a metadata of the specific object 1510. Moreover, if there are a plurality of the counterpart informations in FIG. 15C or a plurality of the found images in FIG. 15D, the mobile terminal 100 is able to set the specific counterpart information (e.g., ID information of a social network service, etc.) or the specific image, which is selected by a user, to the metadata of the specific object 1510 only.

In the following description, a method of storing and managing the metadata set in the setting step S440 and an image (hereinafter named a corresponding image) including the metadata-set specific object is explained in detail.

First of all, the method of storing and managing the metadata and the corresponding image classified into a storing and managing method using the mobile terminal 100 [$1^{st}$ method] and a storing and managing method using the metadata managing server 210 and the content managing server 220 [$2^{nd}$ method].

In the following description, the storing and managing method using the mobile terminal 100 according to the first method is described.

First of all, the mobile terminal 100 is able to store metadata and a corresponding image in the memory 160. And, the mobile terminal 100 is able to further include a separate storing means for storing the metadata and the corresponding image as well as the memory 160.

The mobile terminal 100 is able to store the metadata and the corresponding image in individual storage regions, respectively. And, the metadata and the corresponding image can be stored together in a manner that the metadata is included in the corresponding image. In the latter case, a metadata field is separately provided to the data fields of the corresponding image and the corresponding metadata can be included in the metadata field.

The mobile terminal 100 stores the metadata in the memory 160 and also transmits the corresponding image to the content managing server 220 only [1]. Alternatively, the mobile terminal 100 transmits the metadata to the metadata managing server 210 and also stores the corresponding image in the memory 160 only [2]. Alternatively, the mobile terminal 100 stores both of the metadata and the corresponding image in the memory 160 and also transmits at least one of the metadata and the corresponding image to the corresponding server 210 or 220 [3]. Alternatively, the mobile terminal 100 stores at least one of the metadata and the corresponding image in the memory 160 and also transmits both of the metadata and the corresponding image to the corresponding server 210 or 220.

The mobile terminal 100 is able to transmit the metadata or the corresponding image stored in the memory 160 to the external terminal via the wireless communication unit 110 under the control of the controller 180. Therefore, the metadata and the corresponding image can be shared with a plurality of terminals without using the external server.

The mobile terminal 100 is able to edit the metadata stored in the memory 160 under the control of the controller 180. In particular, the mobile terminal 100 displays the metadata stored in the memory 160 on the screen and is then able to edit the metadata to correspond to a user editing action inputted via the user input unit 130. For instance, the editing action can include one of 'delete', 'modify', 'add' and the like.

In the following description, the storing and managing method using the metadata managing server 210 and the content managing server 220 according to the second method is explained.

First of all, the mobile terminal 100 is able to register the metadata set in the setting step S440 as at least one metadata of a specific object and an image including the specific object with the metadata managing server 210.

In the registering step, the mobile terminal 100 transmits a metadata registration request signal including the set metadata to the metadata managing server 210 using the wireless communication unit 110. The metadata managing server 210 is then able to store and manage the metadata included in the metadata registration request signal.

In this case, the metadata registration request signal can include a corresponding metadata, an identification information (e.g., this information can be included in the metadata as well) on an object having the corresponding metadata set thereon or an image, a restriction condition (mentioned in the foregoing description) set on the corresponding metadata and the like.

If the registering step is successfully performed, the mobile terminal 100 receives a metadata registration success indication signal from the metadata managing server 210 and is then able to provide a user with an indication information indicating that the metadata registration is successfully completed.

Moreover, in the registering step, the mobile terminal 100 is able to further register an image including a specific object having the registered metadata set thereon with the content managing sever 220 separately from the set metadata. For instance, the mobile terminal 100 transmits an image registration request signal including an image having the metadata-set specific object to the content managing server 220 via the wireless communication unit 110. Subsequently, the content managing server 220 is able to store and manage the image included in the image registration request signal.

Meanwhile, if an image including a specific object is stored in or provided from the content managing server 220, the above-mentioned image registering process can be omitted. If the metadata is additionally registered for the image stored in the content managing server 220, the image registering process is not necessary.

In the registering step, the mobile terminal 100 separately performs a metadata registering process and an image registering process, thereby transmitting the metadata and the metadata-set image to the metadata managing server 220 and the content managing server 210, respectively, under the control of the controller 180.

Meanwhile, in the registering step, if the metadata is included in the corresponding image, the mobile terminal 100 is ale to register the corresponding metadata by the image registration with an integrated server and enables the integrated server to store and manage the metadata and the corresponding image, under the control of the controller 180.

According to the present invention, the metadata setting is able to set an information (e.g., comment information, mark information, etc.) inputted by a user to a metadata and is also able to set and register an information (e.g., time information, weather information, etc.) recognized by the mobile terminal 100 or an information (e.g., male/female distribution index, activity index, etc.) provided by an external server as a metadata automatically. Meanwhile, the metadata auto-setting can be performed only if a user inputs a setting confirm action.

In particular, if an information inputted by a user is set to a metadata, it is able to input the information using a voice input. And, the inputted voice itself or a text corresponding to the voice can be set to a metadata.

Although the present specification mainly concerns the metadata settings, the above-mentioned embodiments are applicable to an editing (e.g., deletion, modification, etc.) of preset metadata as well.

According to one embodiment of the present invention, the above-described metadata setting methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, the present invention is able to set metadata of various types, thereby providing a user with various kinds of informations on contents.

Secondly, the present invention is able to set metadata on an object included in an image as well as the image, thereby further extending a range of metadata setting targets as well as providing a user with a detailed information on a specific object included in the image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display;
a user input unit configured to receive inputs;
a memory configured to store information;
a camera configured to capture images;
a controller configured to:
cause the display to display a preview image received via the camera, wherein the preview image includes a specific object;
determine a real size of the specific object with reference to a preset standard object having an assigned standard size according to a type of the standard object from a plurality of types of the standard object each having a different assigned standard size;
determine an actual distance from the mobile terminal to the specific object based on the displayed preview image and the assigned standard size of the type of the standard object;
cause the display to display information of the actual distance;
cause the display to display a list comprising information of a plurality of related objects located within a predetermined distance from the specific object which is located within the actual distance from the mobile terminal in response to a first selection input to the specific object received via the user input unit;
set metadata information of a selected one of the plurality of related objects to metadata information of the specific object in response to a second selection input to the selected one of the plurality of related objects received via the user input unit;
acquire current position information of the mobile terminal and direction information of the specific object relative to the mobile terminal;
acquire position information of the specific object using the acquired current position information, the actual distance of the specific object from the mobile terminal, and the acquired direction information, wherein the direction information is acquired based on a direction faced by the mobile terminal;
set the acquired position information of the specific object to the metadata information for the specific object;

cause the memory to store the metadata information of the specific object;

search the memory for the stored metadata information of the specific object; and cause the display to display information of the selected one of the plurality of related objects.

2. The mobile terminal of claim 1, wherein:
the controller is further configured to:
search the memory for the stored metadata information of the specific object, and
cause the display to display information of the selected one of the plurality of related objects.

3. The mobile terminal of claim 1, wherein the controller is further configured to:
recognize an image region of the displayed image corresponding to the specific object; and
select the recognized image region to correspond to the selected specific object in response to the first selection input.

4. The mobile terminal of claim 1, wherein the controller is further configured to cause the memory to store the metadata information of the specific object and the displayed image in individual storage regions of the memory.

5. The mobile terminal of claim 1, further comprising a wireless communication unit, wherein the controller is further configured to cause the wireless communication unit to transmit the metadata information of the specific object or the displayed image to an external server.

6. A method of setting metadata in a mobile terminal, the method comprising:
displaying, on a display of the mobile terminal, a preview image received via a camera of the mobile terminal, the preview image including a specific object;
determining a real size of the specific object with reference to a preset standard object having an assigned standard size according to a type of the standard object from a plurality of types of the standard object each having a different assigned standard size;
determining an actual distance from the mobile terminal to the specific object based on the displayed preview image and the assigned standard size of the type of the standard object;
displaying, on the display, information of the actual distance;
displaying a list comprising information of a plurality of related objects located within a predetermined distance from the specific object which is located within the actual distance from the mobile terminal in response to a first selection input to the displayed specific object received via the user input unit;
setting metadata information of a selected one of the plurality of related objects to metadata information of the specific object in response to a second selection input to the selected one of the plurality of related objects;
acquiring current position information of the mobile terminal and direction information of the specific object relative to the mobile terminal;
acquiring position information of the specific object using the acquired current position information, the actual distance of the specific object from the mobile terminal, and the acquired direction information, wherein the direction information is acquired based on a direction faced by the mobile terminal;
setting the acquired position information of the specific object to the metadata information for the specific object;
storing the metadata information of the specific object and the displayed image in a memory;
searching the memory for the stored metadata information of the specific object; and
displaying information of the selected one of the plurality of related objects.

7. The method of claim 6, further comprising:
recognizing an image region of the displayed image corresponding to the specific object; and
selecting the recognized image region to correspond to the specific object in response to the first selection input, wherein the first selection input is to the image region.

8. The method of claim 6, further comprising transmitting the metadata information of the specific object or the displayed image to an external server via a wireless communication unit.

* * * * *